US009578188B1

(12) United States Patent
Kircher et al.

(10) Patent No.: US 9,578,188 B1
(45) Date of Patent: Feb. 21, 2017

(54) ENTERPRISE PHOTO / VIDEO EXPERIENCE PLATFORM AND KIOSK SYSTEMS

(71) Applicant: FOXTALES STORYBOOTH LLC, Lake Forest, CA (US)

(72) Inventors: Scott W. Kircher, Mission Viejo, CA (US); Joshua P. Hubberman, Irvine, CA (US)

(73) Assignee: FOXTALES STORYBOOTH LLC, Lake Forest, CA (US)

( * ) Notice: Subject to any disclaimer, the term of this patent is extended or adjusted under 35 U.S.C. 154(b) by 0 days.

(21) Appl. No.: 14/550,967

(22) Filed: Nov. 22, 2014

Related U.S. Application Data

(60) Provisional application No. 61/963,092, filed on Nov. 23, 2013.

(51) Int. Cl.
H04N 5/225 (2006.01)
H04N 5/232 (2006.01)
G06F 3/00 (2006.01)
H04N 1/00 (2006.01)

(52) U.S. Cl.
CPC ........ H04N 1/00244 (2013.01); H04N 5/2256 (2013.01); H04N 5/23216 (2013.01); H04N 5/23293 (2013.01)

(58) Field of Classification Search
CPC ...... G01S 7/4811; G01S 7/4813; G03B 15/05; G03B 15/03; G03B 2215/0539; G03B 15/06; G03B 2215/0592; G03B 2215/0575; G03B 7/16; G06T 2207/10004; G06T 2207/10024; H04N 5/2256; G06K 9/6215
See application file for complete search history.

(56) References Cited

U.S. PATENT DOCUMENTS 6,085,195 A * 7/2000 Hoyt ...................... G03B 17/53
7,728,885 B2 6/2010 Van Schalkwyk
2011/0123184 A1* 5/2011 Mather ................ H04N 5/2256
396/176
2012/0092346 A1* 4/2012 Ording .................. G06F 3/0481
345/473

* cited by examiner

Primary Examiner — Trung Diep
(74) Attorney, Agent, or Firm — One LLP

(57) ABSTRACT

The invention relates to systems and methods for photo and/or video platform, and more particularly to systems and methods for a photo and/or video enterprise platform. In an embodiment, a network connected system comprises a touch screen computing device coupled to an image capture apparatus, a ring flash and a local storage. The computing device receives information from a content management system, provides a user interface at the touch screen display to display information and receive input from users, controls the image capture apparatus and the ring flash to capture image of the users, stores the capture image content captured by the image capture apparatus in the local storage, and uploads the capture image content to the content management system.

15 Claims, 32 Drawing Sheets

ENTERPRISE PHOTO / VIDEO EXPERIENCE PLATFORM AND KIOSK SYSTEMS

CROSS-REFERENCE TO RELATED APPLICATION(S)

The present application claims priority to U.S. Provisional Application No. 61/963,092, filed Nov. 23, 2013, which is hereby incorporated by reference in its entirety.

FIELD OF THE INVENTION

The field of the invention relates to systems and methods for content capture platform, and more particularly to systems and methods for content capture enterprise platform.

BACKGROUND OF THE INVENTION

The original film photo booth has become an iconic medium for documenting memories. However, traditional photo booths have a large, cumbersome footprint and feature dated, bland aesthetics. On the other hand, a digital revolution has swept the world and permanently changed the way that memories are captured, displayed, and promoted.

Existing "photo booth companies" and products have many shortcomings. A major problem is that of managing scalability and facilitating large-scale software licenses. The current offerings on the market are standalone booths instead of platforms that can include both hardware and software that work together, including but not limited to across the cloud, to achieve a set of key functions. The current offerings also are not enterprise platforms that also integrate fluidly with a client's existing strategic marketing framework. Current photo booth offerings are also not flexible. Photo booth kiosks come with a rigid set of software and features that cannot easily be upgraded to flex and integrate with other API's or software applications. In the digital age it is important to be able to easily add new features as they come to life, immediately, on any software device around the world. In addition, current photo booth offerings do a poor job of integrating with user's mobile devices.

Social media properties are the perfect platforms to both house and share a photo booth's captured content. However, current photo booth products on the market lack comprehensive social media integration. With regard to housing (organizing) captured digital content online, current photo booth offerings offer generic gallery views that lack intuitive browsing features or cohesive branding elements.

Furthermore, while a clean, cohesive, well-organized, and socially-integrated online gallery is crucial, the user-interface on the photo booth kiosk itself is equally as important. The current photo booths lack a technologically advanced fully customizable interface that is fun to use, streamlined, and cohesively designed/branded with the online gallery. The user interface on the actual kiosk is how consumers literally "touch and feel" a brand, yet the current product offerings do not provide the opportunity to create a contemporary visually attractive touch screen interface to aid consumer navigation.

Accordingly, it is desirable to provide systems and methods for an enterprise photo and/or video platform.

SUMMARY OF THE INVENTION

Provided herein are embodiments of a device, system, and method for content capture platform, and more particularly to systems and methods for a content capture enterprise platform.

The devices, systems and methods disclose herein an enterprise photo and/or video platform and kiosk applications. A large component of such a platform, herein also known as enterprise platform, is a content management system (CMS) that organizes and controls hierarchies of content. The content includes, for example, photos, videos, animated photos (GIF), analytics, and so on.

Generally, the platform allows a client to login to an online dashboard, remotely modify and manage campaigns (a campaign being defined as a specific, defined use of a field location, e.g., a kiosk), pushing updates to remote kiosks in the field, tracking analytics and demographics, exporting collected data captured from the remote kiosks (e.g., user email addresses), general user data obtained from the kiosks, and so on. The owner of the enterprise platform has privileges, e.g., super user admin privileges, which would allow them to have a high level overview (on their own dashboard) of all client's activities and all kiosks that are being supported in the field (e.g., around the country or around the world). Those with privileges can also login to trouble-shoot client issues.

The enterprise platform solution opens the door to large-scale software licenses not possible with previous solutions since every facet of the business is controlled and catalogued from a central on-line hub making it scalable for clients that execute hundreds of events in a single campaign. The enterprise platform provides hook-in for application extensions into the overall framework and content management system giving the platform unlimited additional revenue streams and capabilities. As an illustrative example of the enterprise platform model and functionality, a license of the enterprise platform, including hardware (e.g., kiosk) and software, is issued to a global client. The client will be able to install photo and/or video capture kiosks in their properties. The client's corporate office will have access to their on-line dashboard to monitor, control, and track every kiosk installed in the field.

In an embodiment, the enterprise platform provides various API's and apps for application extensions to hook-in easily, fluidly and immediately into the content management system. The content management system may be cloud based.

In an embodiment, the enterprise platform is templated and brandable, giving each client the unique ability to create an immersive brand experience for consumers using the platform.

Other features and advantages of the present invention will become apparent from the following more detailed description, taken in conjunction with the accompanying drawings, which illustrate, by way of example, the principles of the present invention.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

Figure 1:
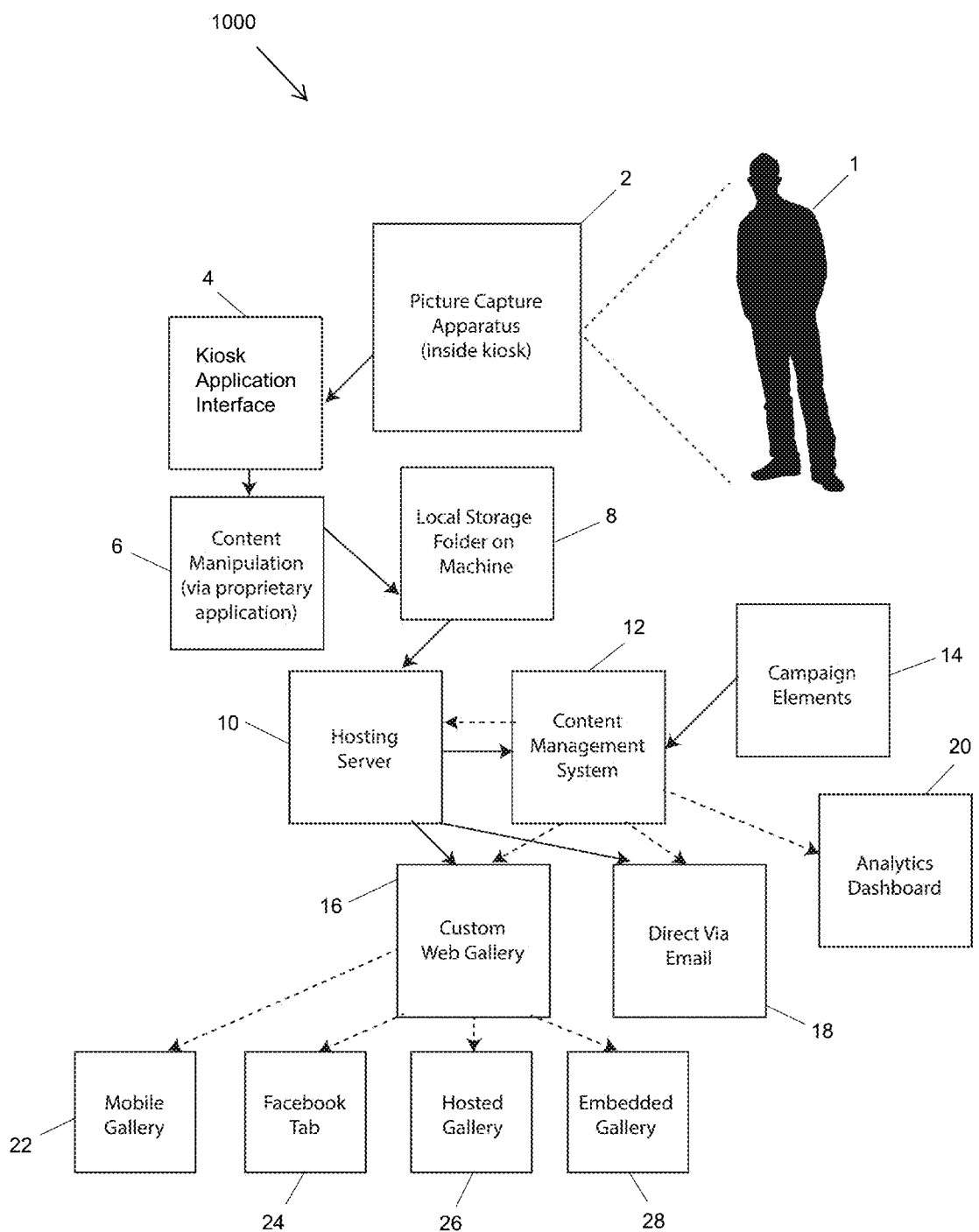
FIG. 1 illustrates an enterprise photo and/or video platform according to an embodiment of the invention.

The above described figures illustrate the described invention and method of use in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

Turning to FIG. 1, according to an embodiment, an enterprise photo and/or video platform and kiosk applications 1000 is shown. In general, the platform 1000 embodies an enterprise photo experience platform. Embodiments of the invention include generally the enterprise photo experience platform software and digital components and the consumer-facing hardware and componentry.

Generally, the platform 1000 allows clients to log-in to a dashboard online, create and manage their campaigns and remotely control photo/video capture hardware, e.g., kiosks and the like, in the field as well as track all of the captured content and collected data through a proprietary Content Management System 12. Super-Admin Users can manage all clients, login remotely for trouble-shooting assistance, and monitor data-usage for billing purposes. The functionality of the platform 1000 allows a pricing structure that is unique in the industry, which is a "pay for the data plan". For example, clients may pay fixed rates for certain data that they capture through their kiosks such as emails collected, impressions generated, and social media actions (e.g., Facebook Likes, Twitter Follows, Instagram Follows, and so on). This is a ROI-driven approach that aligns with strategic marketers. The enterprise platform 1000 provides the clients the capability to easily integrate within their existing operational/marketing framework. Instead of relying on a third party to setup and manage the kiosks and the like, the client can maintain full control and operate autonomously, enabling a license based business model.

Clients have a wide array of flexibility for customizing their photo/video experience campaigns right from their dashboards. They can add custom photo manipulations and branding (e.g., .png watermarking, custom Adobe Photoshop action scripts, and the like), choose where captured content resides (e.g., Facebook Tab Gallery, Hosted Gallery, embedded iFrame gallery, content emailed or texted directly to user, and so on), change social share copy (e.g., across Facebook, Twitter, Instagram, Google+, and so on), moderate content, track analytics and demographic info about their users and social media sharing efforts, and export emails collected at the kiosks. The platform 1000's automated email recaps allow clients to stay up to date with everything that is going on within their various campaigns.

The platform 1000 provides the clients the flexibility to hook into the platform/the Content Management System 12 to add additional features. For example, the platform 1000 can integrate games and surveys that round-out the overall event experience, where they managed directly by the Content Management System 12.

The platform 1000 includes a Picture Capture Apparatus 2. The Picture Capture Apparatus 2 may be located inside a kiosk (shown in FIG. 5). The Picture Capture Apparatus 2 includes, but is not limited to, a digital camera with photo and video capture functionality that has an open API software development kit allowing it to be controlled autonomously by a Kiosk Application Interface 4. The Picture Capture Apparatus 2 also includes an LED ring flash (herein also referred to as ring light) with always on and shutter release settings to light the subject(s) 1.

The platform 1000 also includes Kiosk Application Interface 4 software. In an embodiment, Kiosk Application Interface 4 is for use on touch-enabled devices. The Kiosk Application Interface 4 is what allows a user to interact with the overall platform 1000. Examples of functions of the Kiosk Application Interface 4 include, but are not limited to, allowing the user to choose between photo capture (including animated photo, herein also referred to as animated GIF) or video capture, choosing different photo treatment (manipulation) options, entering emails (or SMS text usernames, or identifications for other communication methods) to receive the captured content, and so on. The Kiosk Application Interface 4 interacts with the camera's software developer kit and controls various aspects of the camera functionality as well as third party photo manipulation software. The Kiosk Application Interface 4 also communicates directly with the Content Management System 12 to upload imagery to the Hosting Server 10, download relevant campaign elements and download software updates. The Kiosk Application Interface 4 is built to be embeddable so that it can easily be installed across the touch devices without having to reconfigure the software. In an embodiment, the Kiosk Application Interface 4 is built for Windows 8 touch-enabled devices. In this embodiment, the Kiosk Application Interface 4 can easily be installed across all Windows 8 touch devices.

The Kiosk Application Interface 4 also includes Content Manipulation 6. Content Manipulation 6 provides custom digital image processing techniques used to produce desired photo effects and treatments. As illustrative examples, Content Manipulation 6 may apply a .png overlay onto a picture, or run an Adobe Action Script to apply a sequence of automated modifications to a digital picture, or saturate images with a specific color treatment. Another illustrative example includes utilization of green screen background and technology. Other digital image processing techniques may also be provided.

In an embodiment, a Local Storage Folder on Machine 8 is located locally with the Picture Capture Apparatus 2. Captured content is locally stored on the Local Storage Folder on Machine 8 prior to being uploaded to the Hosting Server 10. The Local Storage Folder on Machine 8 may be a folder, file, or any storage format, and the content may reside within the framework of the Kiosk Application Interface 4 until upload. Hosting Server 10 is a server where captured content resides online and also what the gallery (described in more detail herein) uses to display content. Captured content may be uploaded and retrieved via a public network, such as the Internet or a cellular-based wireless network, or a private network.

Figure 2:
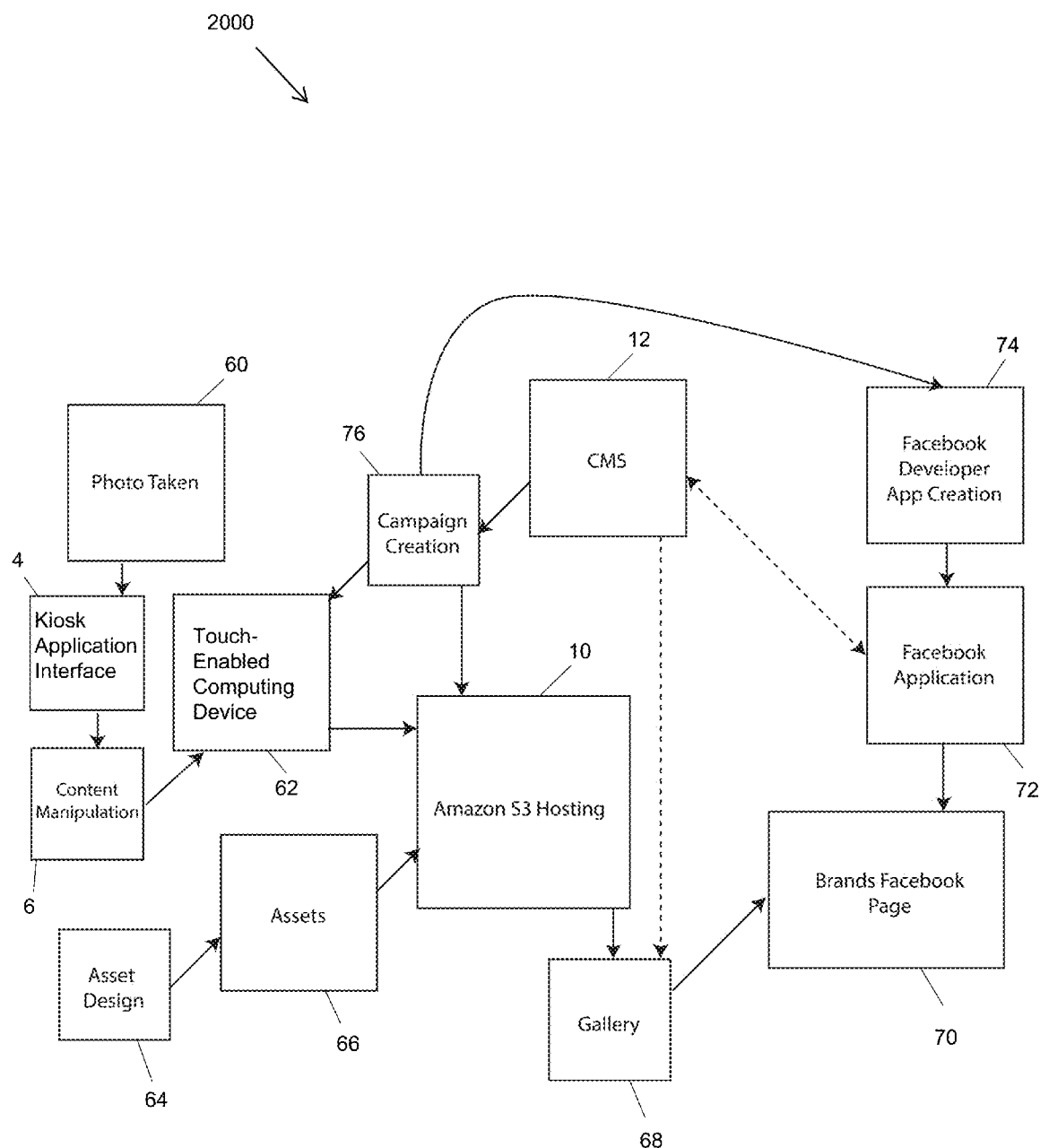
FIG. 2 illustrates a process for capturing and broadcasting content to a custom Tab gallery on Facebook according to an embodiment of the invention.

The Content Management System (CMS) 12 is custom built and represents programs and databases that facilitate, among other functions, publishing, editing, modifying, storing, tracking, and performing maintenance on campaigns, contests, events, and content—from a centralized interface. The Content Management System 12 may be built, for example, using Microsoft's ".net" framework and the like. The Content Management System 12 communicates with the Hosting Server 10 to create content storing structures and also communicates directly with the Kiosk Application Interface 4 to send relevant campaign data. The Content Management System 12 is enterprise in that it allows limitless management of remote Touch-Enabled Computing Devices 62 (as shown in FIG. 2) with Kiosk Application Interfaces 4 and campaigns for third party clients providing easy integration into their marketing structure. The Content Management System 12 serves as the command station of the platform. The Content Management System 12 provides the ability to remotely control machines, update platform elements on the fly. Illustrative functionalities of the Content Management System 12 also include, but are not limited to: add custom photo manipulation (e.g., color filter, color saturation, mask layer, and so on), change social share copy, moderate content, track analytics and other metrics, export and share various forms of data, push software updates to Touch-Enabled Computing Devices 62 with the Kiosk Application Interface 4 in the field, receive automated recap reports, control settings for camera, photo, video, photo calibration, and so on.

In an embodiment, the platform 1000 also includes Campaign Elements 14 which represents features of a campaign; a campaign being illustrated by a defined group of captured content with unifying elements. For example, a campaign may be a certain national music tour. Campaign Elements 14 may include, but are not limited to: Campaign Title, Event Title, interface graphic assets, photo manipulation files, gallery assets and colors, gallery location, social templates, and so on.

In another embodiment, the platform 1000 includes Custom Web Gallery 16 which represents a general template for an online gallery displaying content, social media sharing links and feeds, promotional additions that are relative to a certain client's events and objectives (illustrative example of a promotional addition includes a clickable banner ad), and so on. In an embodiment, the Direct Via Email 18 option bypasses the on-line gallery options and delivers the captured content directly to the user via email. Other delivery methods, for example, SMS texts and so on, can also be supported.

Figure 10:
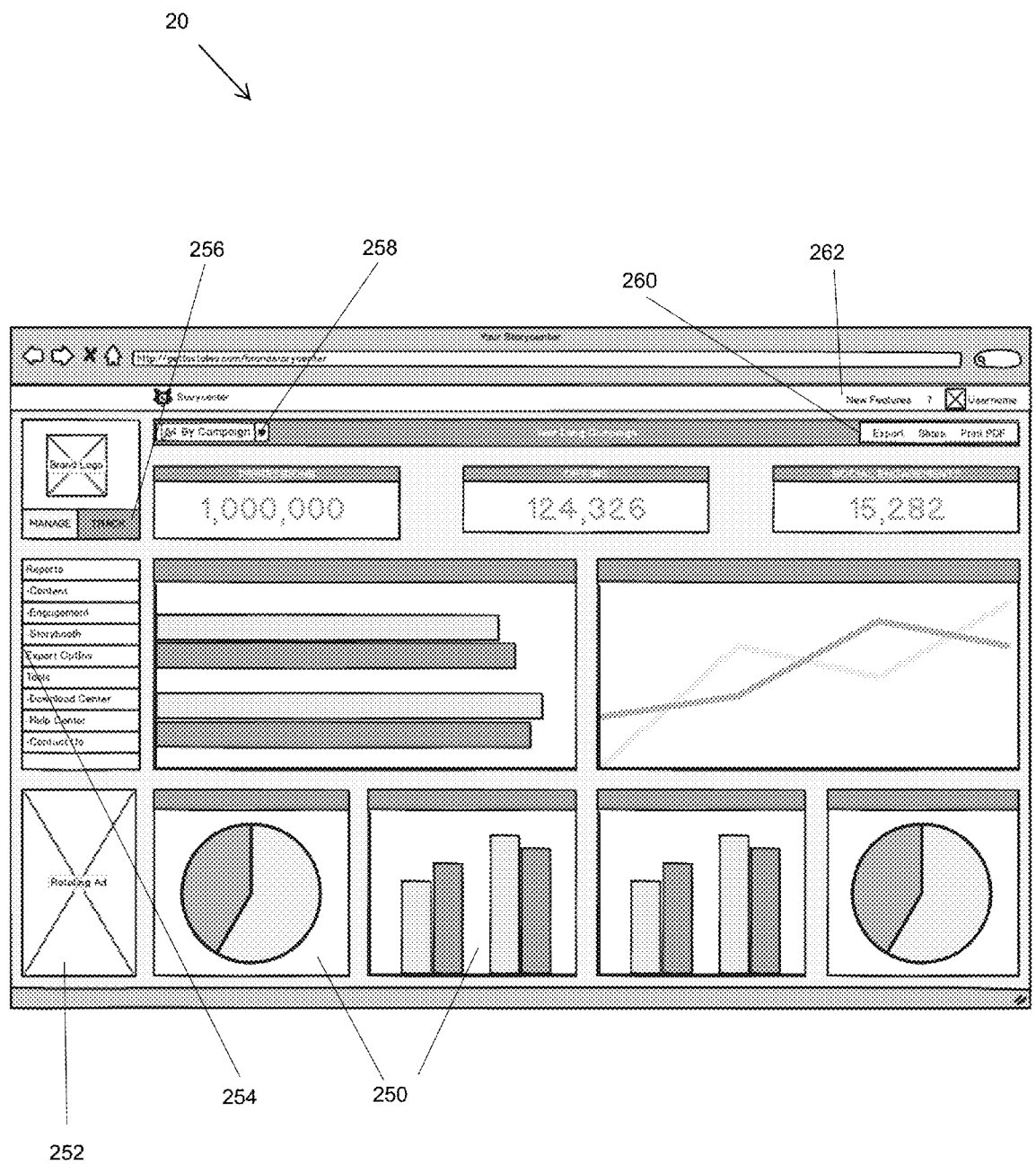
FIG. 10 illustrates a client Analytics Dashboard according to an embodiment of the invention.

Additionally, the Content Management System 12 includes an Analytics Dashboard 20. In an embodiment, after a user inputs their email in the Kiosk Application Interface 4, the user is sent an email with a link to the content of the user. Upon clicking the link, a "cookie" is stored on the user device allowing the platform 1000 to track the user session. Other delivery methods can also be supported. The user's actions within the session are tracked, and the Analytics Dashboard 20 reports back to the client metrics such as, but not limited to: emails collected, impressions, social actions (e.g., Likes on Facebook, Followers on Twitter and Instagram, etc.) for each campaign, and so on. Users can display these metrics visually with illustrative chart and graph reports. FIG. 10 illustrates an example of an Analytics Dashboard 20, and is described in more detail below.

In an embodiment, a Mobile Gallery 22 represents a brandable gallery for content viewing on a mobile device (e.g., a phone, tablet, etc.). The Mobile Gallery 22's grid system is responsive (auto-resizes) to ensure correct proportions so that it can be viewed on any device. The Mobile Gallery 22 may include, but is not limited to, functionalities to let users scroll through content, e.g., with swipe manipulation, and easily share content across a wide variety of social media networks. The Facebook Tab 24 represents a display option for the content gallery template that is housed within an actual "Tab" on the client's Facebook page. A "Tab" is a way of segmenting out and organizing content on a Facebook Page and is a feature that exists within the framework of what Facebook allows from a custom development standpoint. A Hosted Gallery 26 represents the general gallery template being hosted on a website. However, if a client wants to embed the general gallery template on the client's website, this would be accomplished by using the Embedded Gallery 28 option where the general gallery template is embedded, for example into an iframe, on the client's website property. It is noted that the platform 1000 is a fully brandable mobile-gallery, allowing users to immediately share their content.

In an embodiment, the platform 1000 also provides local printing.

Turning to FIG. 2, according to an embodiment, a process 2000 of the platform 1000 is shown for capturing and broadcasting content to a custom Tab gallery on Facebook. Process 2000 includes at least three directional flows. The first flow starts with Photo Taken 60, which represents a certain user's action, for example, the capture of a picture, animated GIF, or the recording of a video, being facilitated at the Picture Capture Apparatus 2 with the Kiosk Application Interface 4. Once content is captured at step Photo Taken 60, the captured content is driven by the Kiosk Application Interface 4 which sends Content Manipulation 6 commands (see descriptions under FIG. 1 above). The Kiosk Application Interface 4 then facilitates the uploading of the content to on-line Hosting Server 10 (e.g., Amazon S3 Hosting 10) where it is then displayed in a gallery (e.g., Gallery 68) and then on the brand's Facebook Page 70, where the gallery resides in a custom Tab on the client's Facebook Page.

The second flow of the illustrative process 2000 starts on the client side and begins with the Content Management System 12. The client uses Campaign Creation 76 to create a new campaign and push (download) the campaign elements to the Touch-Enabled Computing Device 62. When creating a new campaign with Campaign Creation 76, the client chooses where the gallery template will be hosted, and in the illustrative process 2000 of FIG. 2, the client chooses that the Gallery 68 is hosted on the brand's Facebook Page 70. The Campaign Creation 76 functionality integrates with Facebook's open API's through Facebook Developer App Creation 74. Facebook Developer App Creation 74 creates a specific Facebook Application 72 for the client campaign. The Facebook Application 72 allows the template gallery to be broadcast on the brand's Facebook Page 70 simply by signing into the Content Management System 12 and selecting an "add to Facebook" button (not shown).

The third flow of the illustrative process 2000 begins with Asset Design 64, which describes the template that is used for the graphical design and customization of the templates associated with a given campaign. Once the design is completed, the Assets 66 are uploaded into the Hosting Server 10 (e.g., Amazon S3 Hosting 10) where they are then sent to the Gallery 68 and finally to the Brand's Facebook Page 70.

Figure 3:
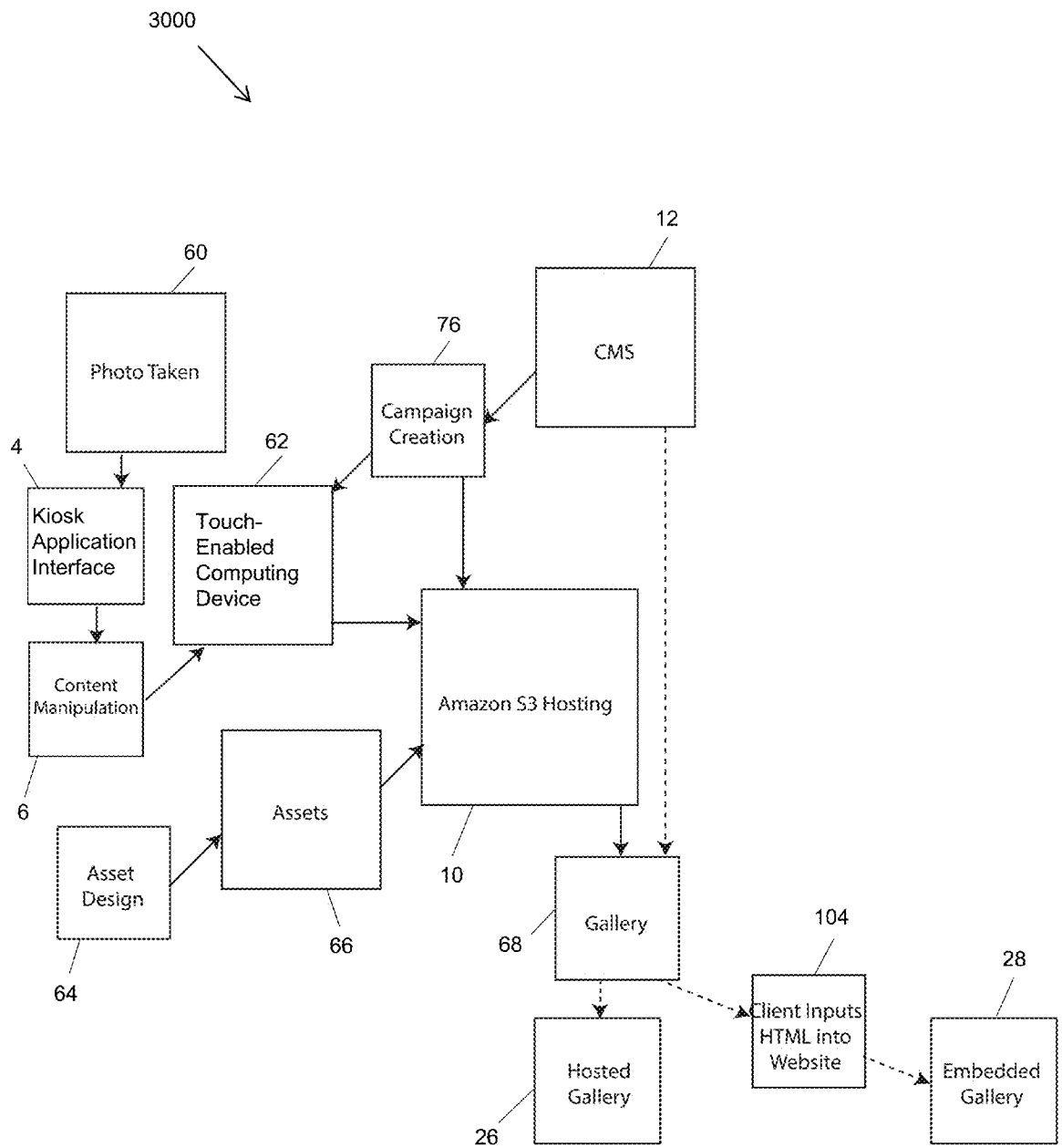
FIG. 3 illustrates a process capturing and broadcasting content to a web gallery according to an embodiment of the invention.

Turning to FIG. 3, according to an embodiment, a process 3000 of the platform 1000 is shown for capturing and broadcasting content to a web gallery. The majority of the flow of the process 3000 is similar to the steps listed in process 2000 as shown in FIG. 2. In illustrative process 3000, the client uses the Content Management System 12 to select the Campaign Creation 76 of a campaign that has a template gallery for the content that is embedded in a standard website (e.g., as an iframe). The client creates the Gallery 68 and then inputs HTML into their Website 104 which results in the Embedded Gallery 28 appearing, e.g., inside of an iframe embedded in the desired website. If a client does not want to embed the template gallery in a specific website (for example, a website that is a key component of their strategic marketing efforts), the client can elect to have the template gallery resides at a specified URL on the platform 1000's website which is the Hosted Gallery 26.

In an embodiment, an event's captured content resides on a customized and sorted gallery which also pulls in a social media feed from all of the event's social media posts.

Figure 4:
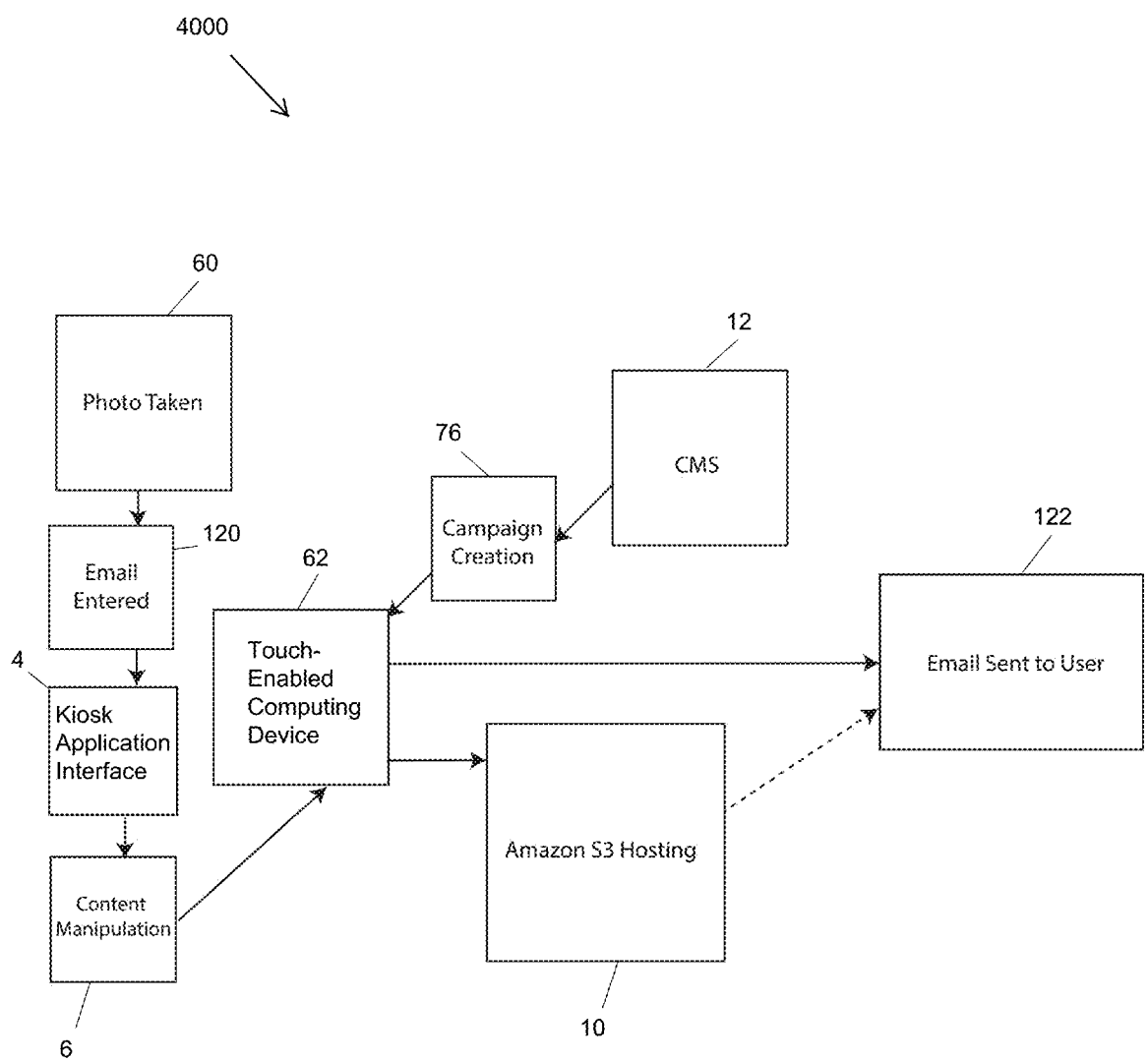
FIG. 4 illustrates a process for broadcasting captured content directly to a user through email according to an embodiment of the invention.

Turning to FIG. 4, according to an embodiment, a process 4000 of the platform 1000 is shown for broadcasting captured content directly to a user through email. A client starts the process 4000 by using the Content Management System 12 for Campaign Creation 76 and elects the option to send the captured content directly to a user through email. A user uses the Touch-Enabled Computing Device 62 to capture a form of content (including, but not limited to, photos, animated GIFs and videos) (see Photo Taken 60 step in FIG. 2). The Kiosk Application Interface 4 then asks the user to enter at least one email address. Once the user enters at least one email address, the Kiosk Application Interface 4 uploads the captured content to the Hosting Server 10 (e.g., Amazon S3 Hosting 10) and then sends to the given email address(es) the access, e.g., a link, to the captured content via Email Sent To User 122. In an embodiment, thumbnail index of the captured content is also uploaded to the Hosting Server 10 and an access, e.g., a link, to the thumbnail index is sent to the given email address(es) together with the access to the captured content. It is noted that, additionally or alternatively, other methods of communications, e.g., SMS text, may also be utilized by the platform 1000.

Figure 5A:
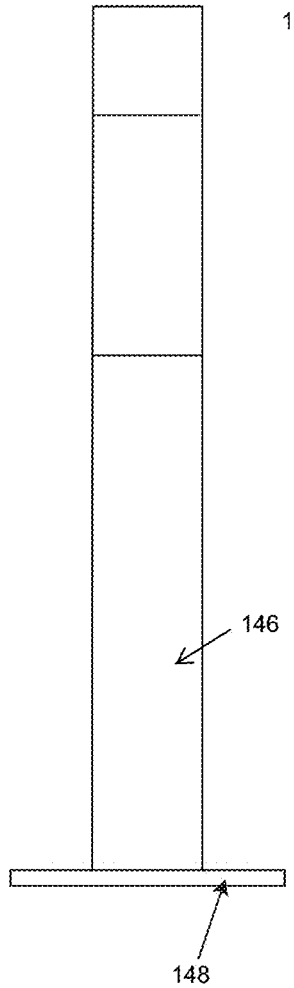
FIG. 5A illustrates a side view of a kiosk enclosure according to an embodiment of the invention.
Figure 5B:
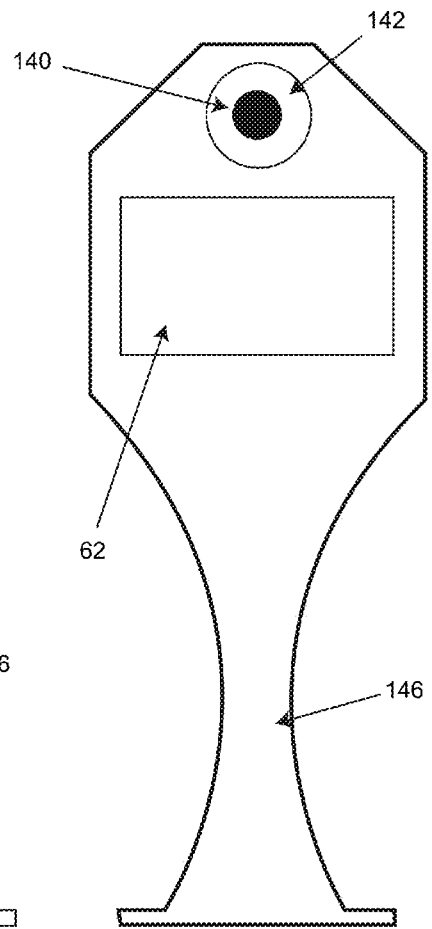
FIG. 5B illustrates a front view of a kiosk enclosure according to an embodiment of the invention.
Figure 5C:
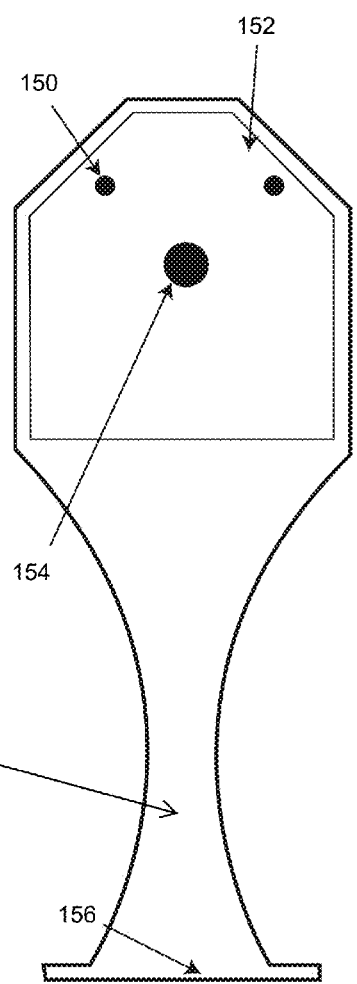
FIG. 5C illustrates a rear view of a kiosk enclosure according to an embodiment of the invention.

Turning to FIGS. 5A to 5C, according to an embodiment, a construction, componentry inside of, and overall design of a Kiosk Enclosure 146 is shown. FIG. 5A shows a side view of the Kiosk Enclosure 146. FIG. 5B shows a front view of the Kiosk Enclosure 146. FIG. 5C shows a rear view of the Kiosk Enclosure 146. The Kiosk Enclosure 146 has a Ring Flash (herein also known as Ring Light) 142 custom mounted in a bracket and surrounding the lens of an Image Capture Device 140. The Ring Flash 142 provides both constant lighting for when a user (e.g., subject 1 in FIG. 1 or the like) opts to capture video content and flash functionality for pictures. The Ring Flash 142 gives captured content a uniform, well-lit, and overall professional result. The Ring Flash 142 is controlled by the Kiosk Application Interface 4 and the Image Capture Device 140 SDK that is installed on the Touch-Enabled Computing Device 62. An illustrative example of an Image Capture Device 140 is a DSLR camera. The Image Capture Device 140 is custom mounted to the Kiosk Enclosure 146 by rotating brackets. The Touch-Enabled Computing Device 62 can have a relatively large screen size (e.g., over 21") in order to draw the attention and intrigue of users and to provide as immersive and memorable of a user experience as possible. The Touch-Enabled Computing Device 62 is held in place by a custom mounting bracket that isolates the Touch-Enabled Computing Device 62 from the sides of the Kiosk Enclosure 146. This prevents vibration or any other form of external pressure from being transferred to the Touch-Enabled Computing Device 62. The Circular Base 148 must be heavy enough to prevent the Kiosk Enclosure 146 from falling over if it is knocked or pushed. Kiosk Enclosure 146 should be thin enough to ensure that the overall weight is not overly burdensome for transport and setup but also should be thick enough to ensure durability and structural integrity. The Kiosk Enclosure 146 may be made entirely of aluminum since plastic panels would need to be glued on (which are not as durable and can come unglued rather easily with high temperatures). The Locking Rear 150 prevents unauthorized personnel from opening the Rear Access Door 152 and accessing the valuable componentry housed inside the Kiosk Enclosure 146. The Cooling System Vent 154 is to ventilate the Touch-Enabled Computing Device 62 and keep it cool. The Hole for Plug On Bottom 156 is for power cord threading that looks clean and does not disturb the balance of the Kiosk Enclosure 146. In another embodiment, the Kiosk Enclosure 146 also includes external flash.

The Kiosk Enclosure 146 is network connected (e.g., with the Internet) and delivers content immediately so that when the user leaves the Kiosk Enclosure 146 the user is presented with an email, or the like, that takes the user to the gallery, e.g., the Mobile Gallery 22, where the platform 1000's intuitive social share options are presented. The social share features are designed to integrate directly into the mobile experience.

In an exemplary embodiment, a stand-alone Kiosk Enclosure 146 contains a touchscreen computer running a proprietary Windows 8 Embedded Application with proprietary integration with Canon's or Nikon's Software Developer Kit and DSLR camera (that captures photos and video), and a built-in Ring Flash 142, all housed in a custom built kiosk made of aircraft-grade aluminum. In another embodiment, all internal hardware and software of the Kiosk Enclosure 146 can be installed without the stand-alone kiosk frame, but installed on a support structure, for example, on a wall or tripod mount.

In an embodiment, the platform 1000 is fully brandable, allowing clients to fully change the look of the entire platform for each event.

Figure 6:
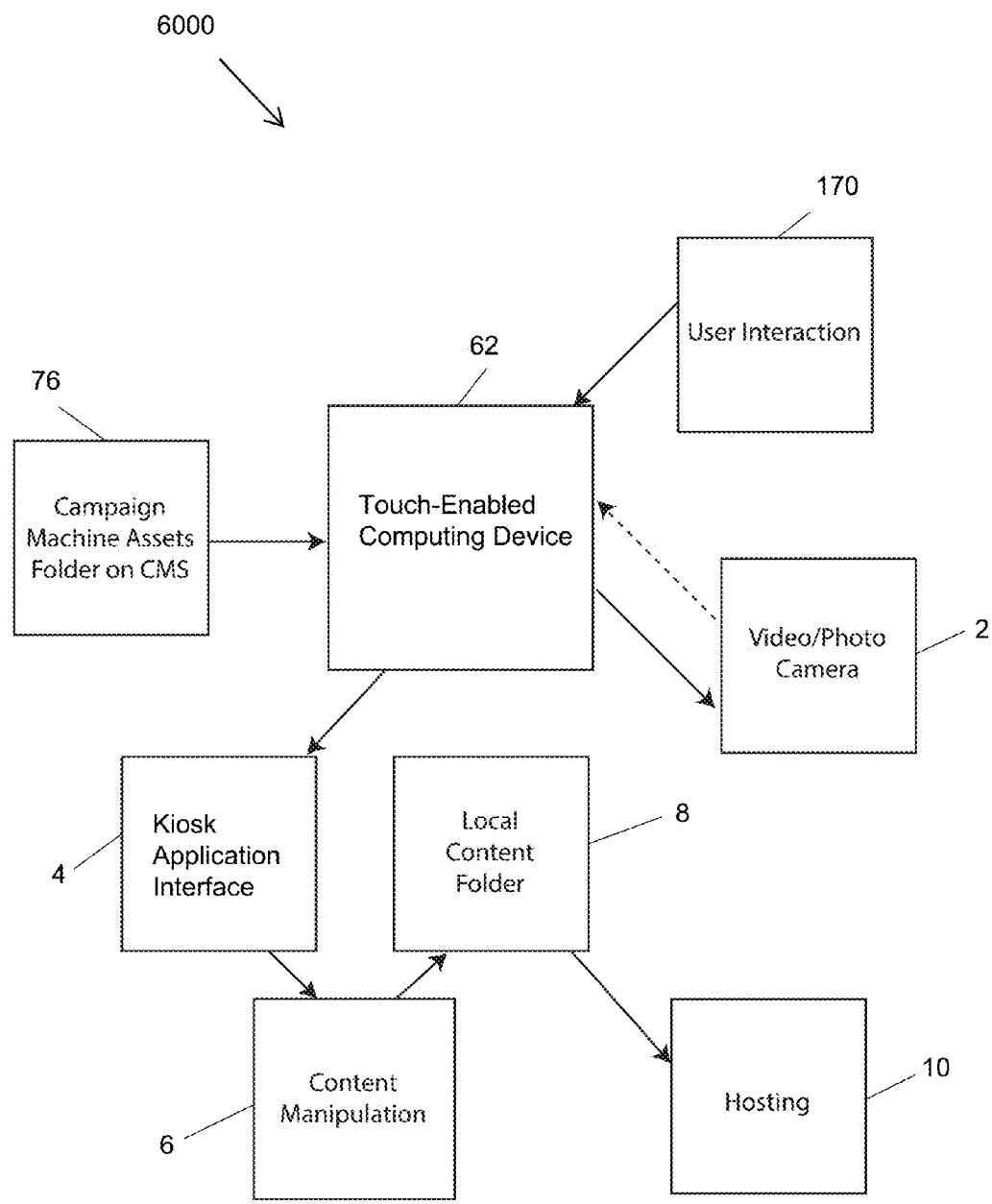
FIG. 6 illustrates a user process according to an embodiment of the invention.

Turning to FIG. 6, according to an embodiment, a user process 6000 of the platform 1000 is shown. User process 6000 begins with a client designing a specific interface design for the Kiosk Application Interface 4 using the Campaign Machine Assets Folder on CMS 76. The platform 1000 provides the client the capability to fully customize a user interface. For example, a client could customize the background to ensure cohesion with their brand identity and create custom buttons with unique animations. Once the interface is designed, exported, and installed on the Touch-Enabled Computing Device 62 (e.g., a unique Kiosk Application Interface 4 is created and downloaded), a user (e.g., subject 1 in FIG. 1 or the like) is ready to engage with the touchscreen interface, which represents a given user walking up to the Touch-Enabled Computing Device 62 and choosing an option on the Kiosk Application Interface 4. Illustrative examples of functionalities that the user can select include, but are not limited to, choosing to record a video or capture a photo or animated GIF (Video/Photo Camera 2). The captured content is stored in a Local Content Folder 8 (after Content Manipulation 6 occurs), and then uploaded to Hosting Server 10 for display and access.

Figure 7:
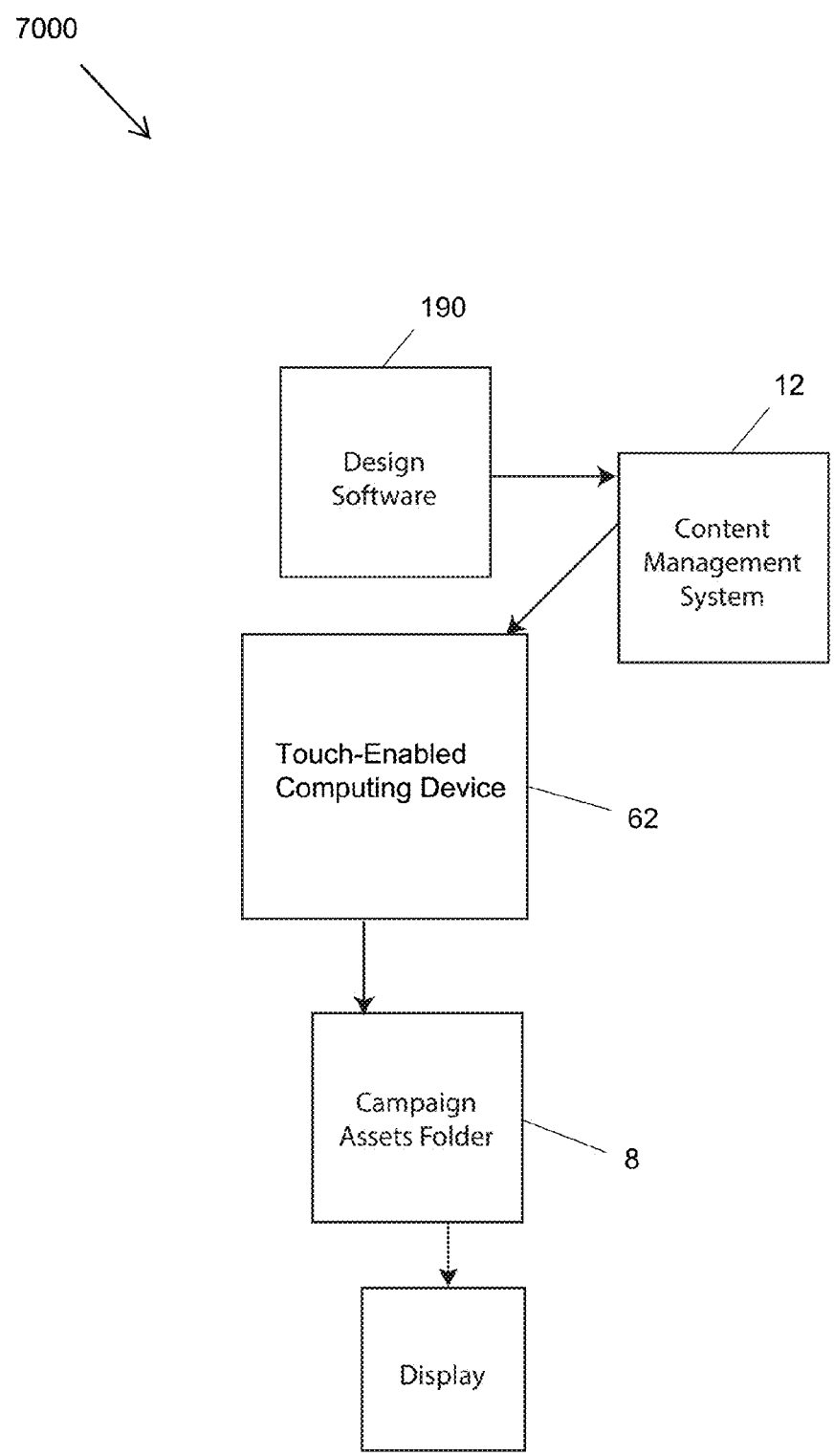
FIG. 7 illustrates a custom interface design process according to an embodiment of the invention.

Turning to FIG. 7, according to an embodiment, a custom interface design process 7000 of the platform 1000 is shown. Process 7000 starts with a client using Design Software 190 (an illustrative example would be Adobe Photoshop) to create the assets needed to fill various templates for specific functionality (illustrative examples include, but are not limited to, templates for interface design, gallery design, photo overlays, green screen, and so on). The client then uploads these completed templates into the Content Management System 12. When a Touch-Enabled Computing Device 62 with the Kiosk Application Interface 4 is signed into for that specific campaign, the content is downloaded to that specific location/ID. On the Touch-Enabled Computing Device 62 that resides in the Kiosk Enclosure 146 and within the structure of the Kiosk Application Interface 4, there is a Campaign Assets Folder 8 that stores graphical files which are then displayed on the Touch-Enabled Computing Device 62 during Kiosk Application Interface 4 function.

Figure 8:
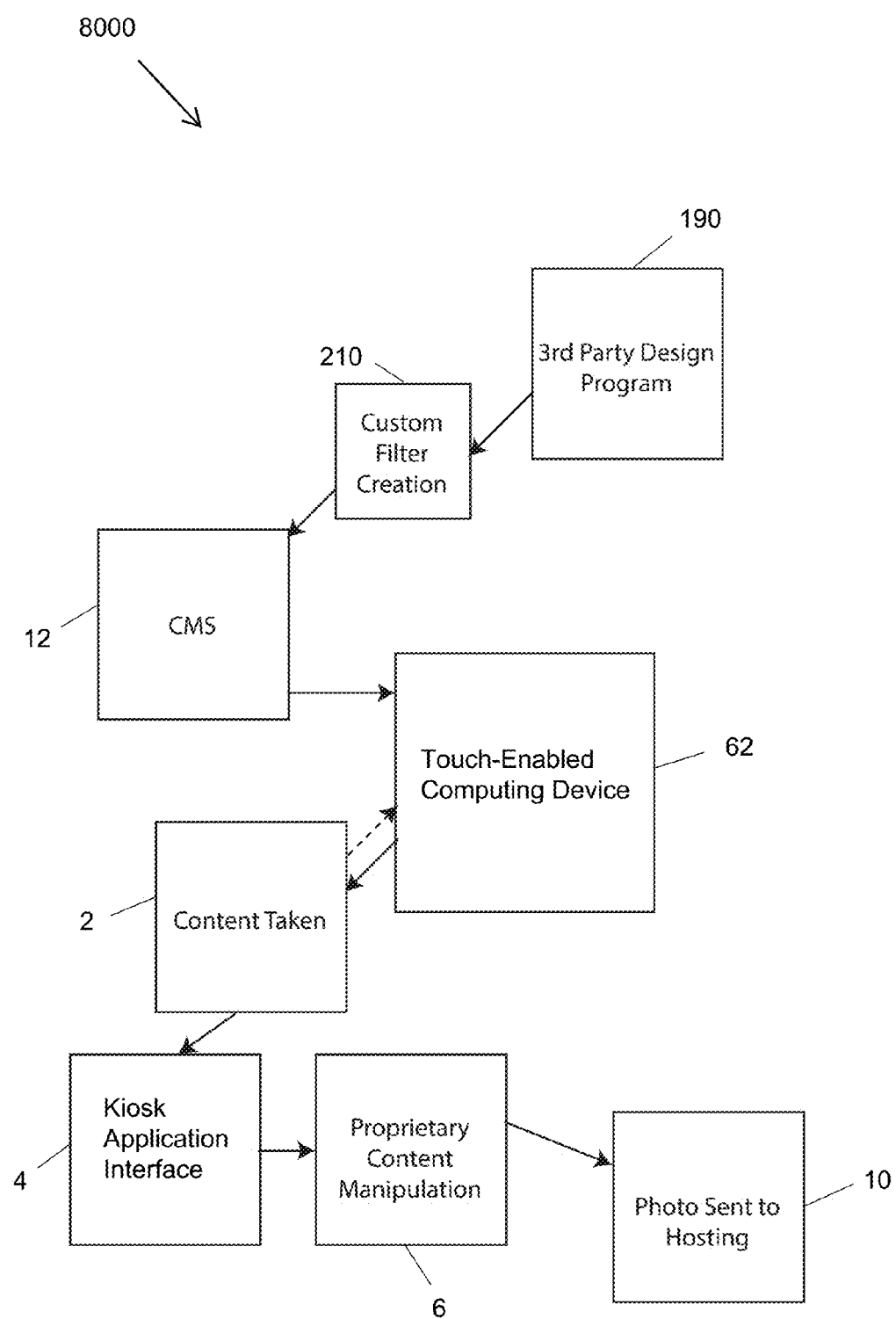
FIG. 8 illustrates a photo manipulation process according to an embodiment of the invention.

Turning to FIG. 8, according to an embodiment, a photo manipulation process 8000 of the platform 1000 is shown. Process 8000 starts with a Third Party Design Program 190 (e.g., Adobe Photoshop). A client then uses the program to create a Custom Filter Creation (custom action script or method for manipulating content) 210. When complete, the script is uploaded into the Content Management System 12 and then pushed out to the Touch-Enabled Computing Device 62 and Kiosk Application Interface 4 housing the correct campaign upon client login. Content is captured by a certain apparatus (e.g., a photo or a video taken at step Content Taken 2). Once the desired content is captured, The Kiosk Application Interface 4 runs the Proprietary Content Manipulation 6 to apply the Custom Filter Creation 210 to the content. The completed piece of modified content is then uploaded to Hosting Server 10.

Figure 9:
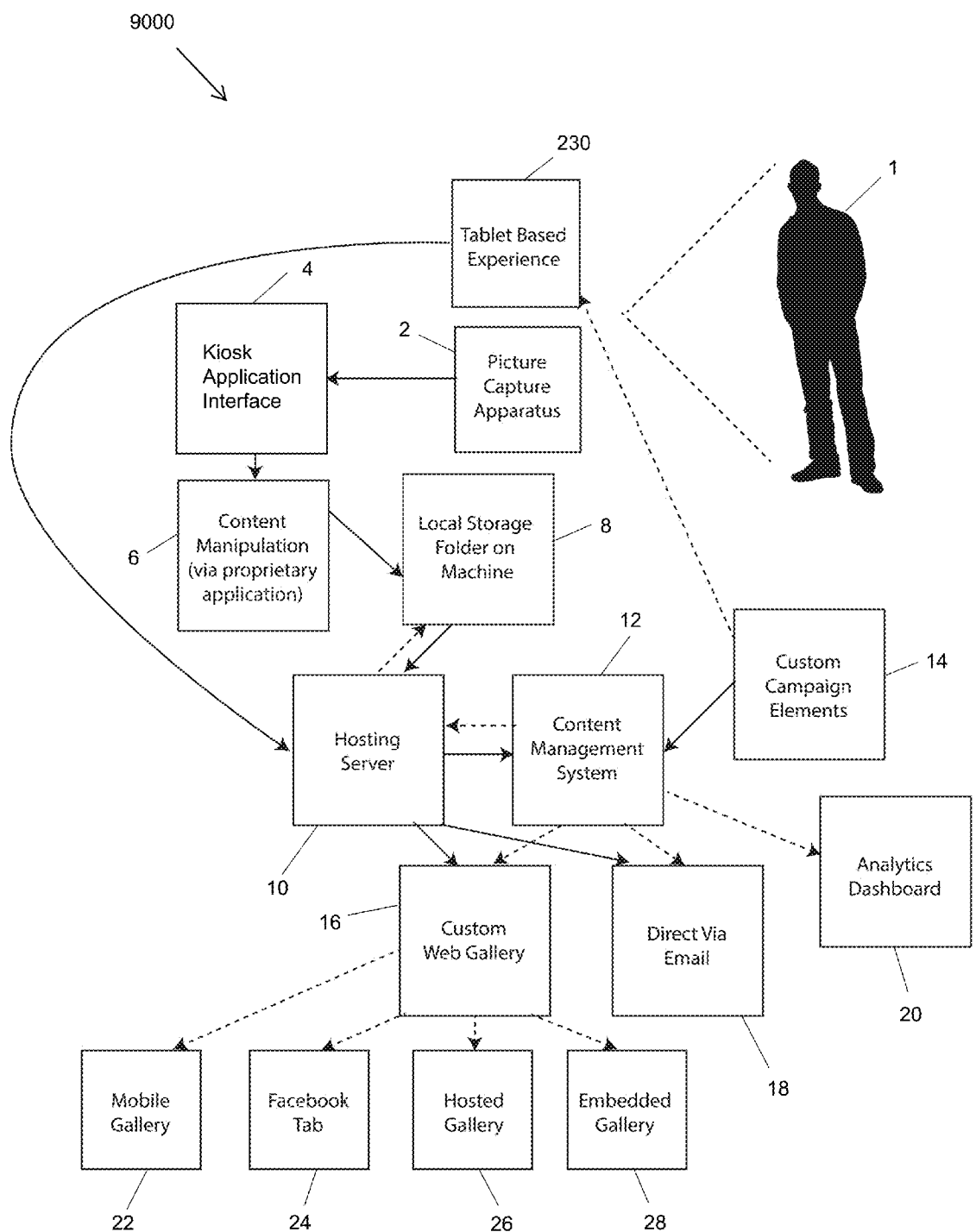
FIG. 9 illustrates a tablet based experience process according to an embodiment of the invention.

Turning to FIG. 9, according to an embodiment, a tablet based experience process 9000 of the platform 1000 for the integration of surveys or other custom platform extension applications is shown. The majority of FIG. 9 is similar in functionalities and process to FIG. 1 (see FIG. 1 above). In process 9000, in addition to or alternatively to functionalities and process in FIG. 1, illustrative examples of a tablet based experience include, but are not limited to, survey applications and game applications. A Tablet Based Experience 230 is hooked in to the Content Management System 12 through the Custom Campaign Elements 14 functionality. The Tablet Based Experience 230 then communicates and sends information to the Hosting Server 10 which communicates back with the Content Management System 12 for functions like, but not limited to, data aggregation. Turning to FIG. 10, according to an embodiment, a client Analytics Dashboard 20 is shown. The client Analytics Dashboard 20 is part of the Content Management System 12. The Charts and Graphs 250 section is one of many illustrative examples on the client Analytics Dashboard 20 that showcases a visual representation of a set of metrics. For example, a client can select a metric like "average number of social engagements on Facebook per post" and compare this to "average number of social engagements on Twitter per post." Clients can view metrics changing over time as line graphs and bar charts as well and get detailed insights from "donut charts and pie charts". It is noted that the above examples are illustrative and do not represent the full functionality of the dashboard relating to visually displaying analytics/metrics. The Page Navigation 254 houses management functions, with illustrative examples shown. The Manage/Track Selection 256 toggles back and forth between "management" functionality and "track" functionality (for example, aggregating and displaying analytics reporting). Export Options 260 represent ways that a client can send, share and print data featured in the dashboard with colleagues. Client Admin 262 represents the header for client login, logout, settings and upgrade reminders for clients when new functionality/feature sets become available. Filter Results By: 258 represents a means to alter the way analytics and results are displayed.

Aside from Analytics Dashboard 20, the Content Management System 12 also can be used to manage campaigns, add and remove new events, moderate and delete content and more.

Figure 11:
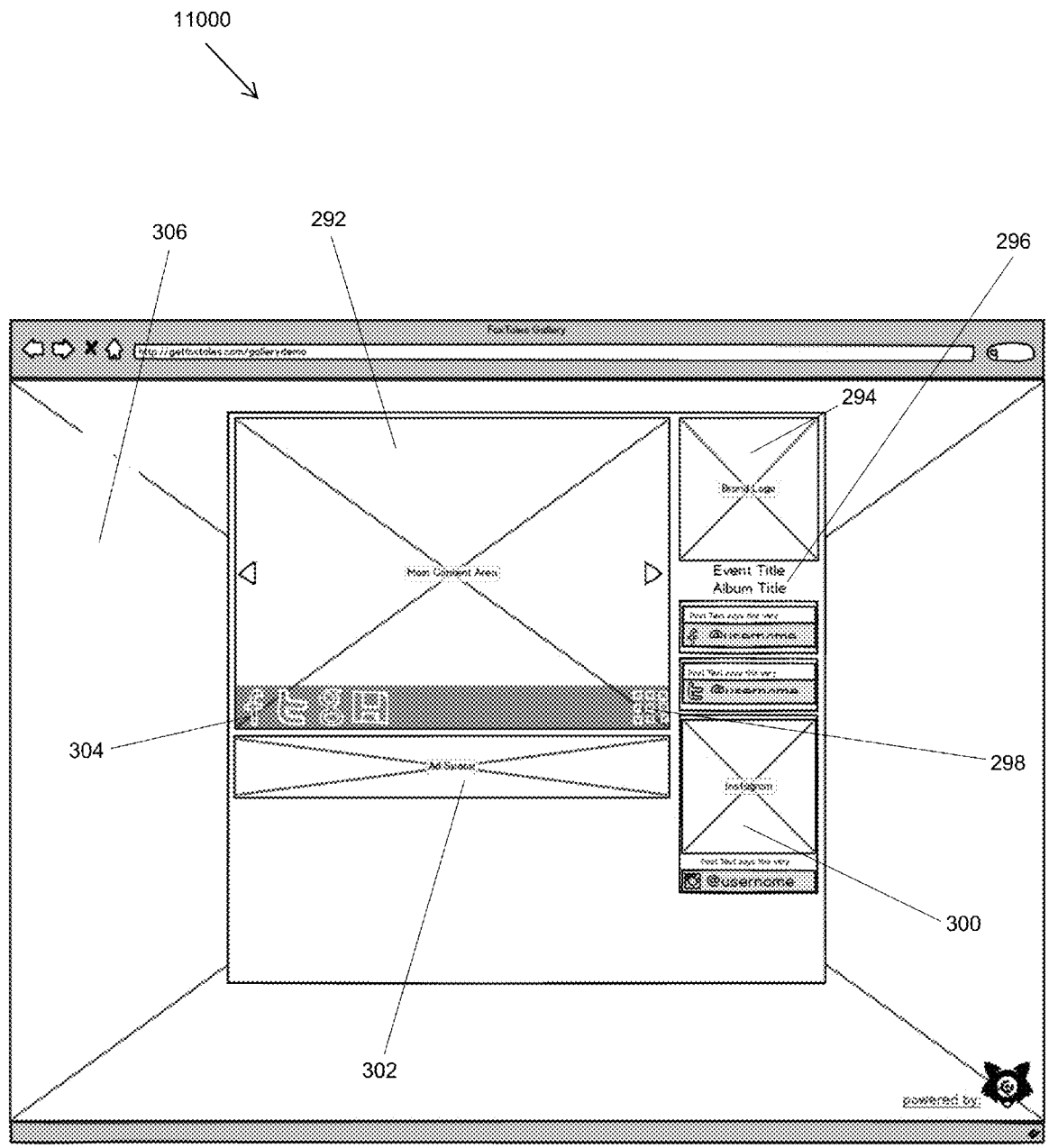
FIG. 11 illustrates an exemplary content gallery template according to an embodiment of the invention.

Turning to FIG. 11, according to an embodiment, an exemplary content gallery template 11000 is shown. The template 11000 may be used as an example for the galleries discussed in other Figures herein. The Main Content Area 292 is the main content area where visitors to the gallery can move between specific content. Visitors can also navigate content by Event Title or Album Title 296. The client can add their Brand Logo 294, and customize the page background image (The Customizable Area 306) to fit the client's design objectives. There may be a Social Feed 298 integrated into the gallery which pulls in a live feed of specific targeted categories from various social media networks and displays them in-line. Visitors to the gallery can scroll through this Social Feed 298. There may be a customizable Ad Space Gridspot 302 where clients can insert special promotions. Visitors to the gallery can easily share the captured and displayed content on various social networks (Social Network Share 304). Visitors can also download the content.

Figure 12:
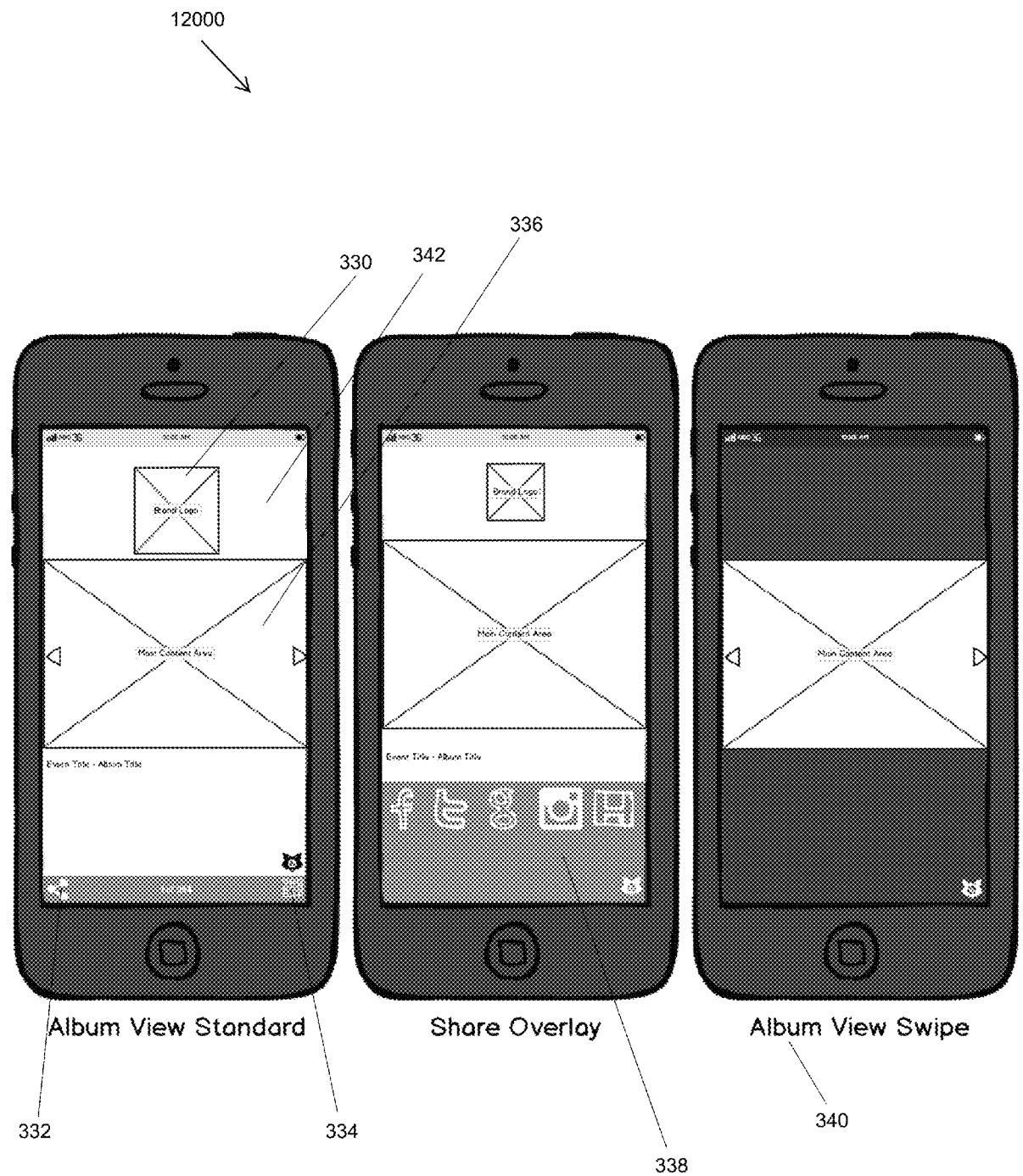
FIG. 12 illustrates a mobile phone responsive integration and functionality according to an embodiment of the invention.

Turning to FIG. 12, according to an embodiment, a mobile phone responsive integration and functionality 12000 is shown. A Client Logo 330 can be customized by the client, and the design template also allows for a customizable background image 342. The Share Toggle 332 brings up the Share Overlay 338 which allows the selected displayed content to be shared to various social networks. All of the social share copy is fully customizable by the client on the Content Management System 12 for streamlined and predictable communication. Clients can Toggle Thumbnail View 334 to view a zoomed out gallery of event thumbnail content. Or, clients can browse by Album View 340. Default settings for content display may have content displayed in the Main Content Area 336.

Figure 13A:
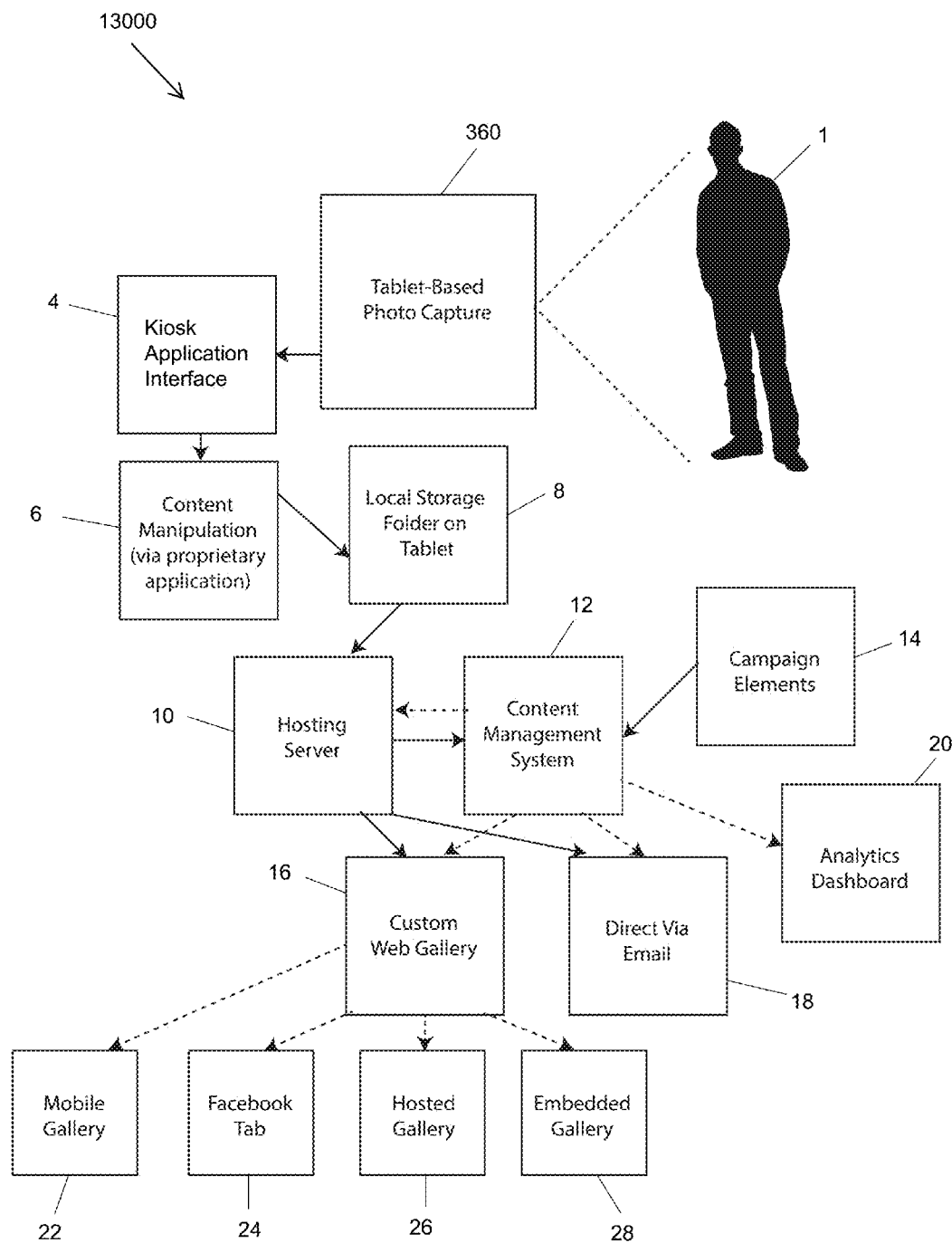
FIG. 13A illustrates a mobile tablet-based image-capture solution according to an embodiment of the invention.

Turning to FIG. 13A, according to an embodiment, a mobile tablet-based image-capture solution 13000 is shown. To understand FIG. 13A, it is substantially similar to FIG. 1 but switching out the Picture Apparatus 2 (e.g., inside a kiosk) for a mobile tablet-based image-capture solution Tablet Based Photo Capture 360. As mentioned previously, The Kiosk Application Interface 4 is an embeddable application so that it can easily be installed on various computing platforms. In FIG. 13A, instead of the Kiosk Application Interface 4 being powered on a Touch-Enabled Computing Device 62, the Kiosk Application Interface 4 is installed on a tablet, or like device, and is using the tablet's internal hardware to capture and manipulate content. In an embodiment, the tablet may be surrounded by a Ring Flash (not shown), utilizing LED technology or any other suitable lighting technology. The tablet may be installed in any desired orientation, e.g., horizontal, vertical, and so on.

Figure 13B:
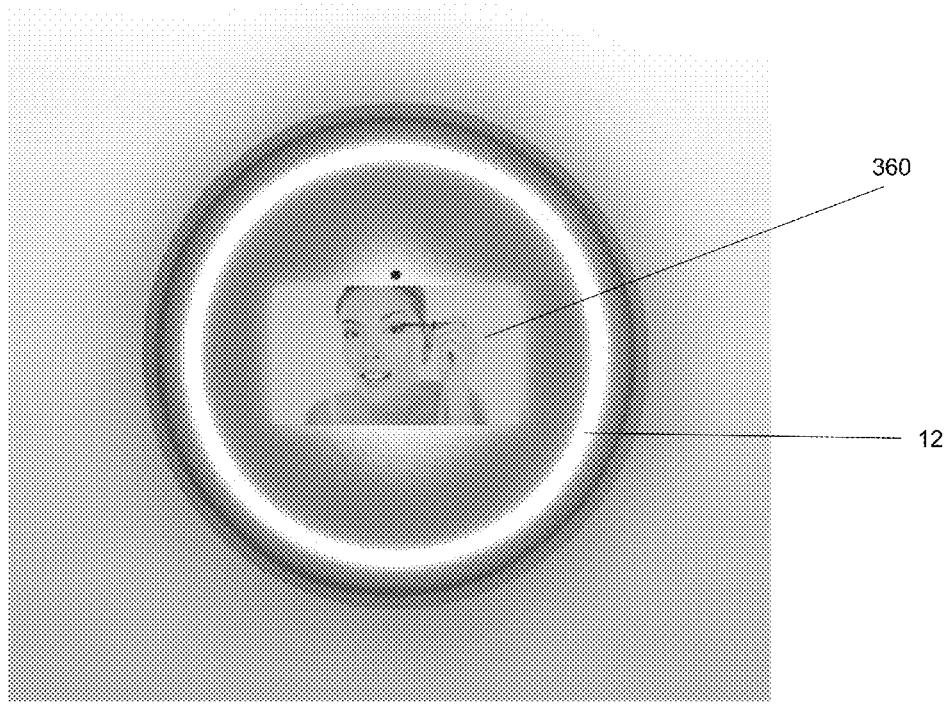
FIGS. 13B to 13D illustrate exemplary external and internal structure of a mobile tablet-based image-capture platform according to an embodiment of the invention.
Figure 13C:
Figure 13D:
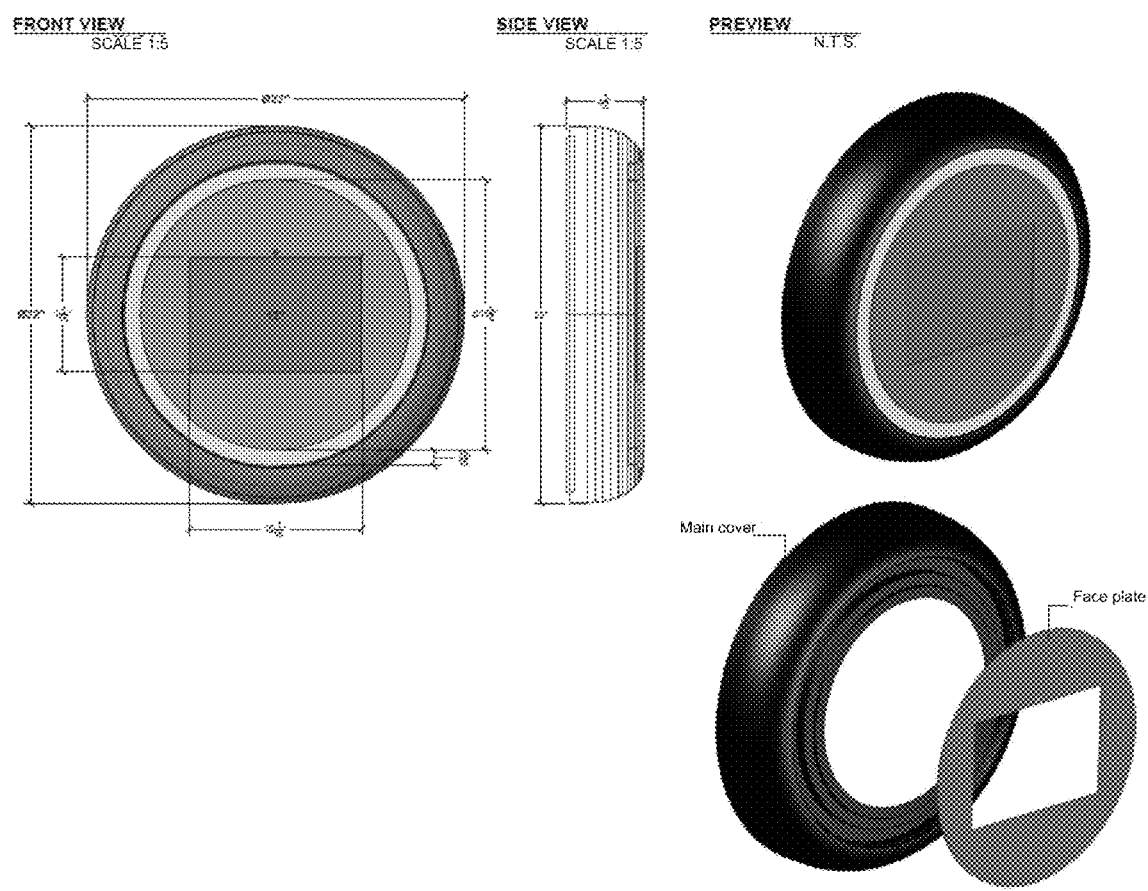

Turning to FIGS. 13B to 13D, according to an embodiment, exemplary of external and internal structure of the mobile tablet-based image-capture platform is shown. In an embodiment, the Ring Flash 12 may include a row of LED lights that reflect outwardly creating a ring look to illuminate subjects. The back LED's are color controlled via application, such as the Kiosk Application Interface 4. The structure can accept additional cameras. In this embodiment, the mobile tablet-based image-capture platform can be wall or tripod mount.

Turning to FIGS. 14A to 14J, according to some embodiments, exemplary mobile tablet-based user interfaces of the platform 1000 are shown. The user interfaces of FIGS. 14A to 14J allow the mobile tablet-based clients to search, select and download campaigns, events, albums, and so on, and adjust camera settings. The user interfaces allow users to select photo manipulation options, take photos or video content, enter email, SMS text and social media contacts, and so on.

Figure 14A:
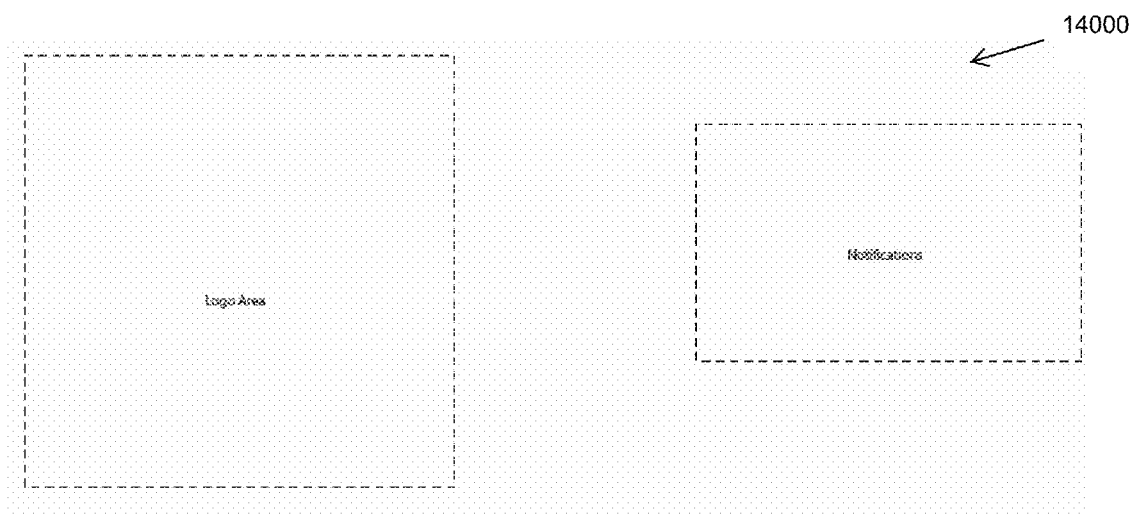
FIGS. 14A to 14J illustrate exemplary user interfaces of a mobile tablet-based image-capture solution according to some embodiments of the invention.
Figure 14B:
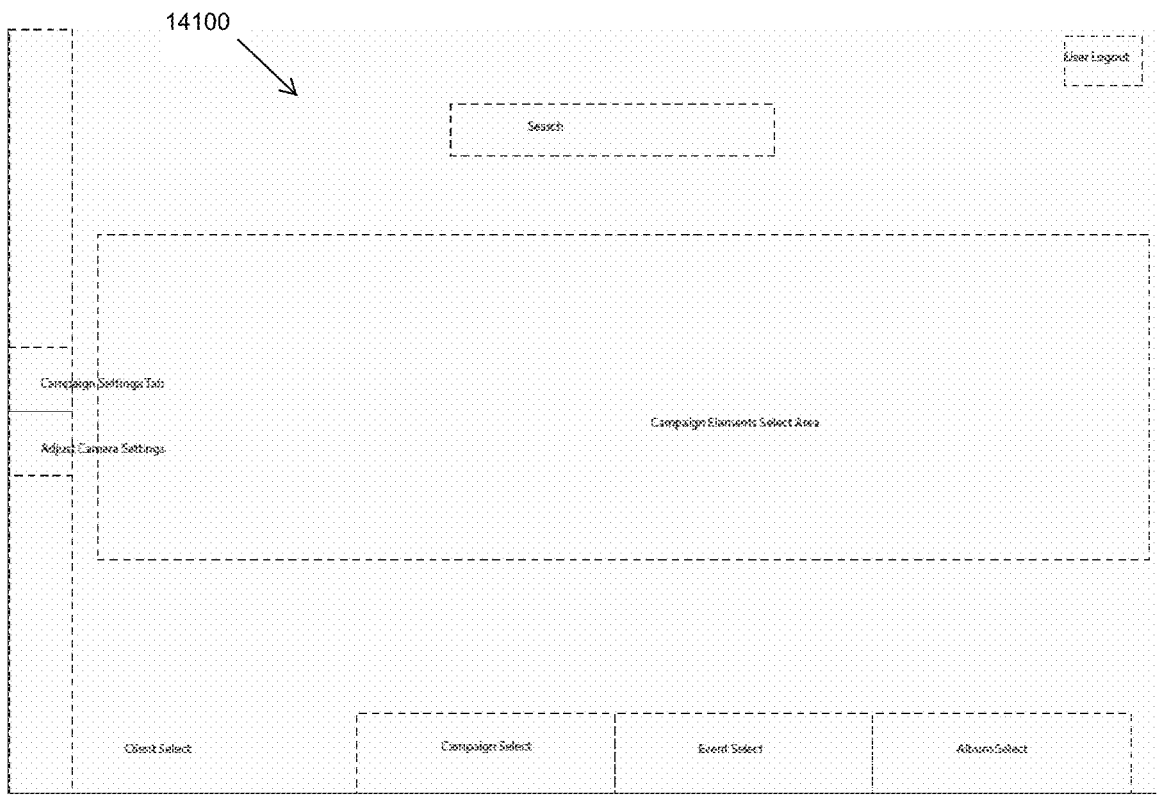
Figure 14C:
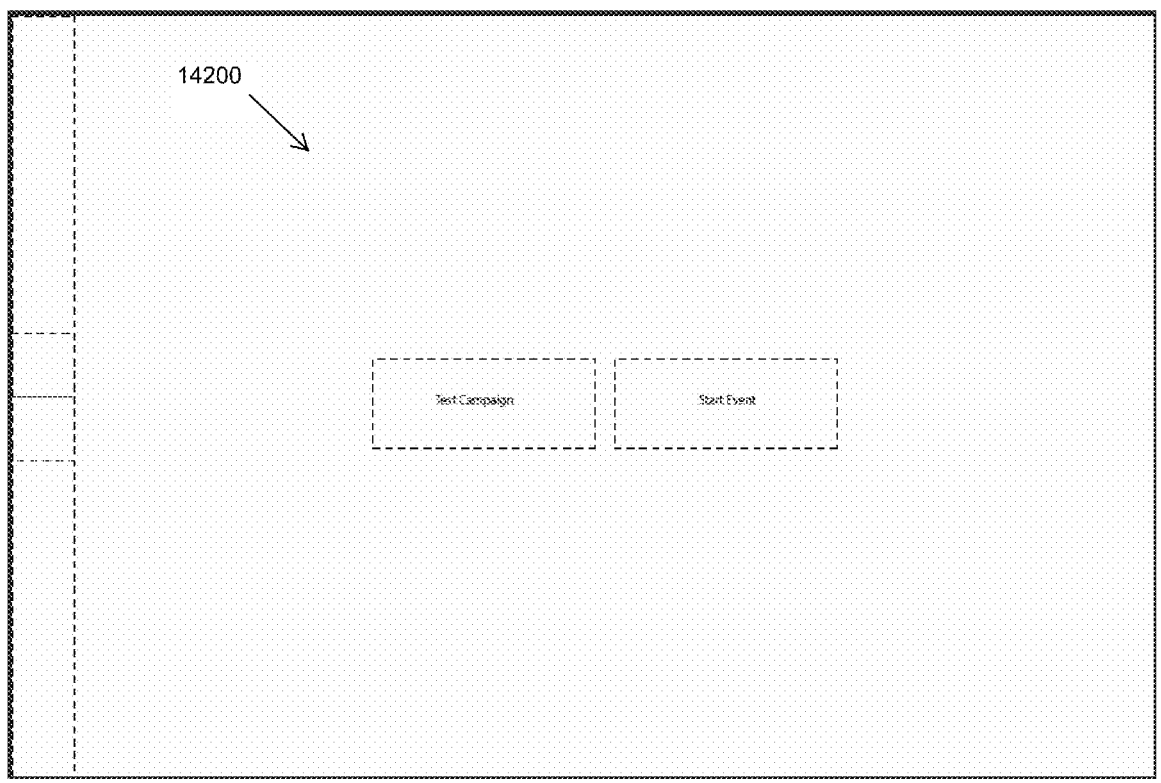
Figure 14D:
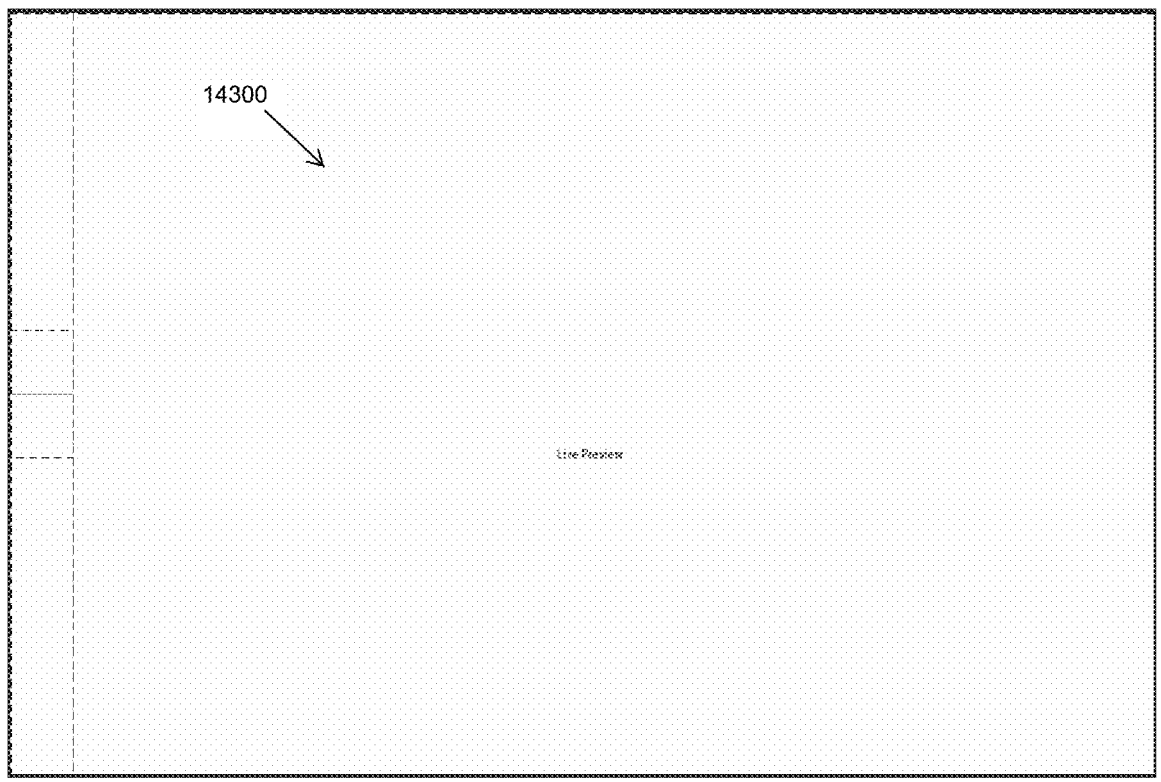
Figure 14E:
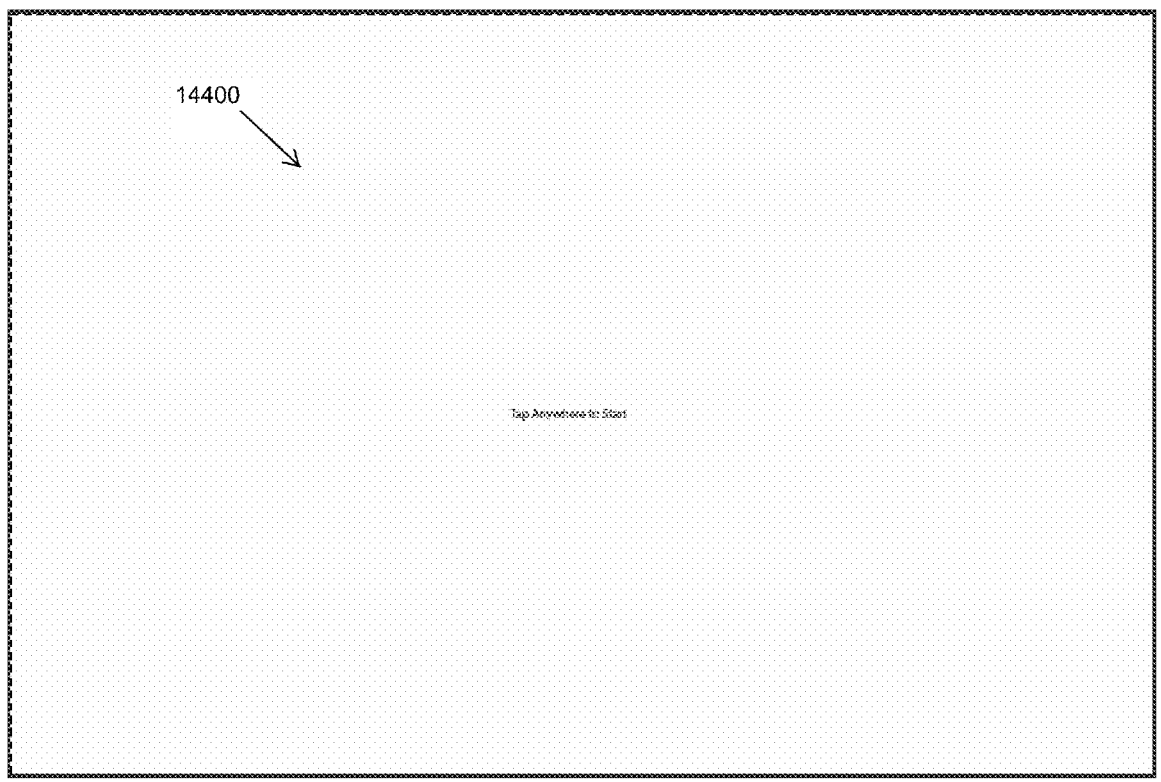
Figure 14F:
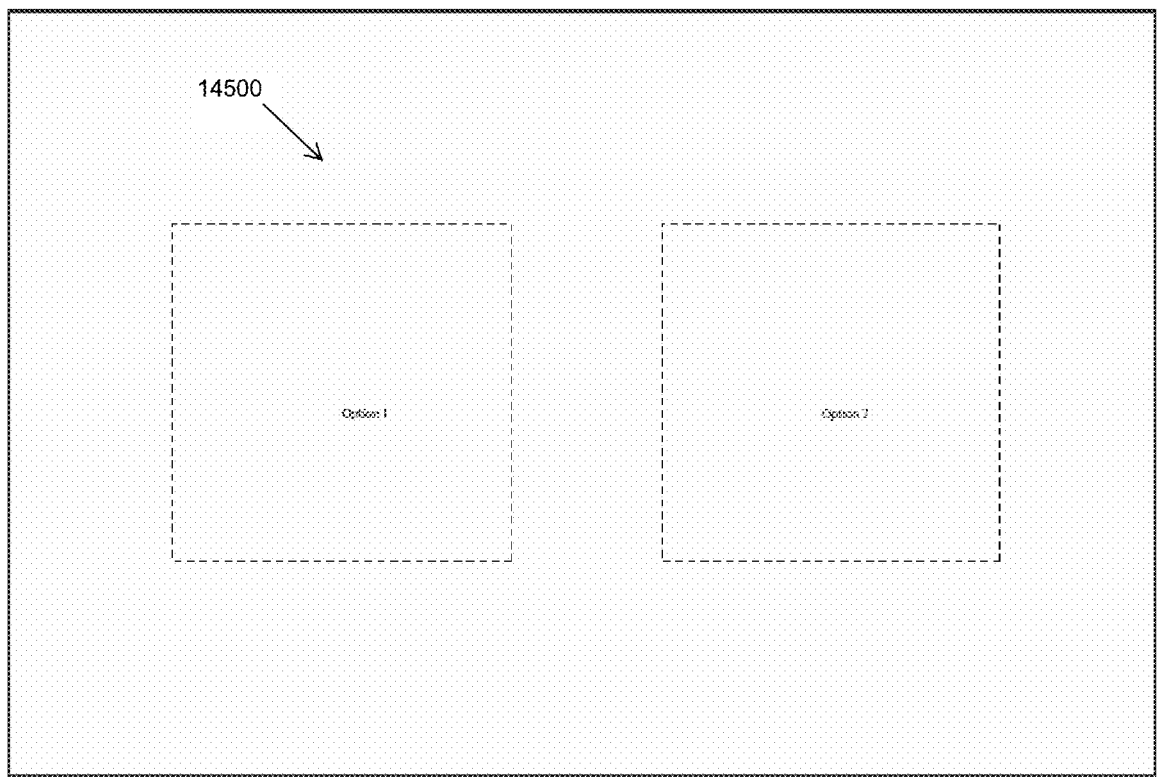
Figure 14G:
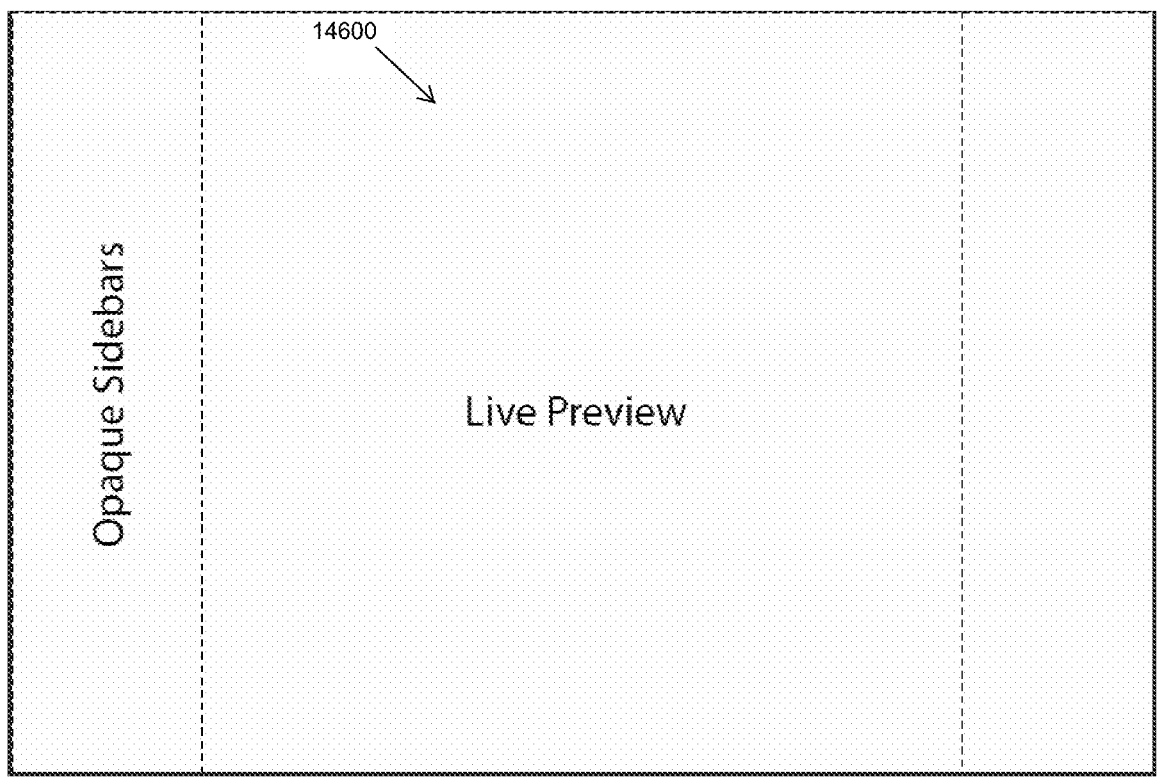
Figure 14H:
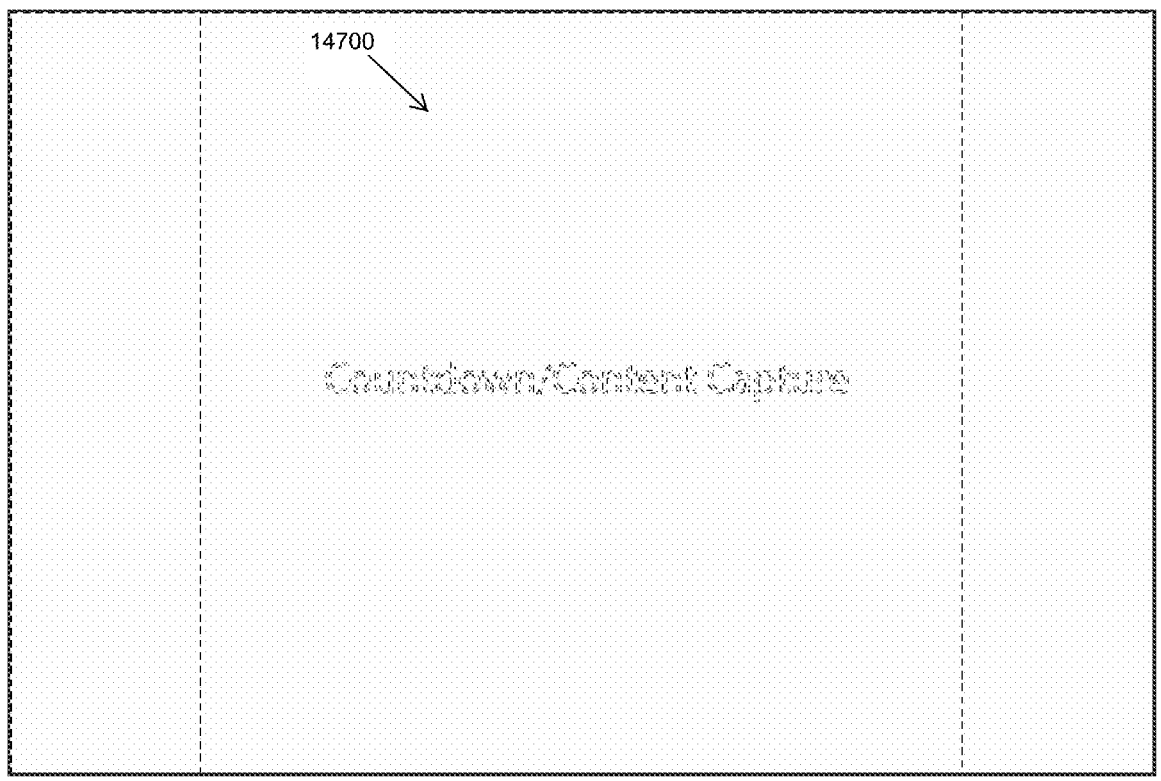
Figure 14I:
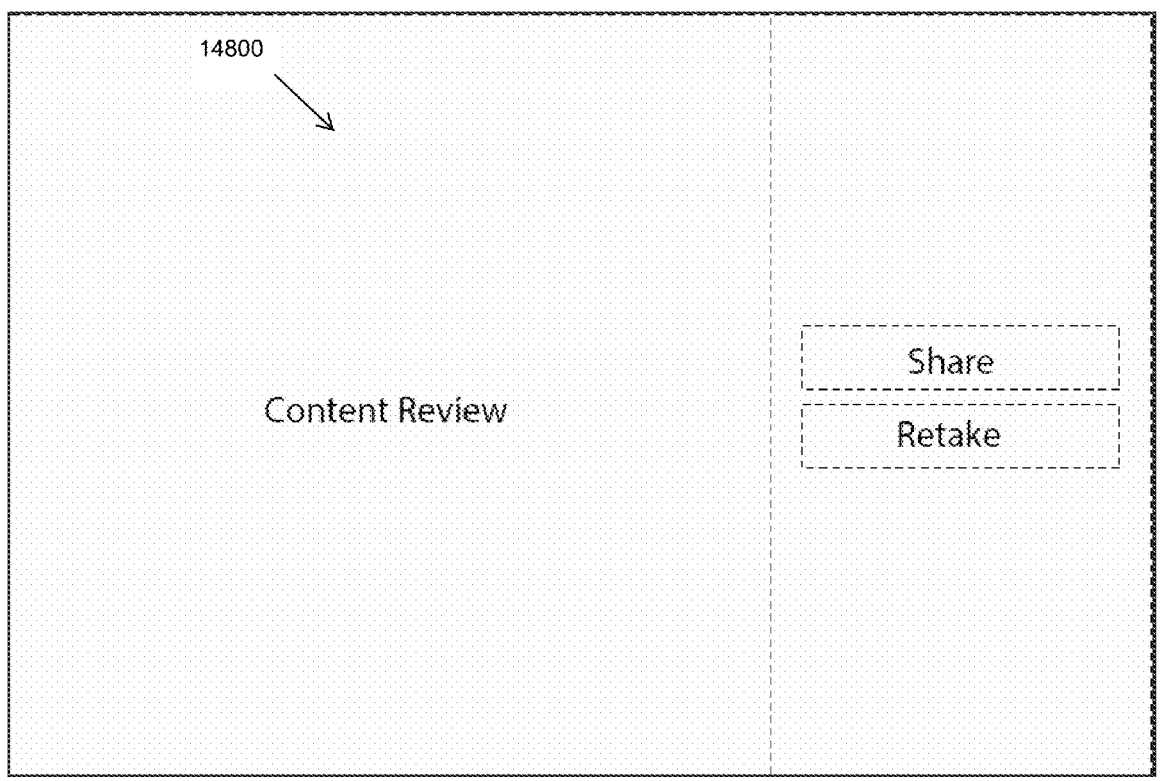
Figure 14J:
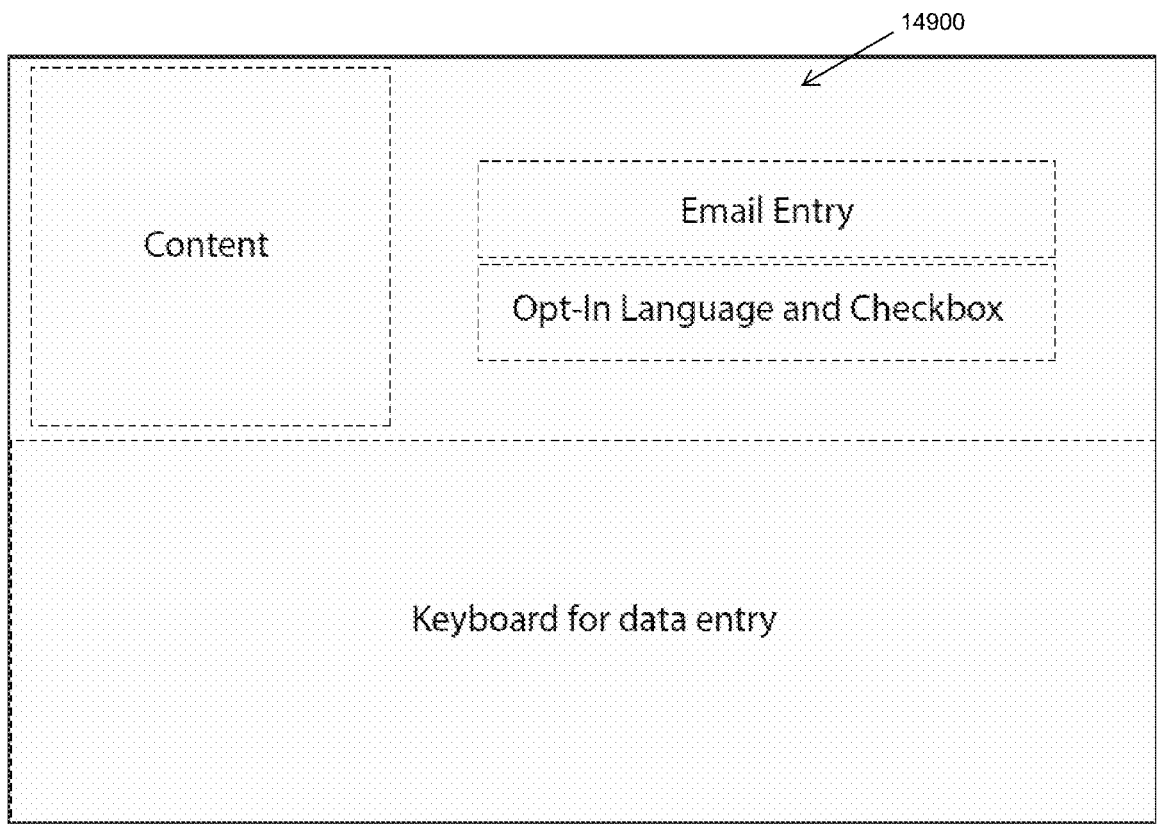

The user interface 14000 (FIG. 14A) provides clients the means to ensure a proper internet connection prior to attempting to login to the content management system. In user interface 14100 (FIG. 14 B), clients can adjust the camera settings, search the Content Management System for and select campaigns, events, albums, and so on. Once the selected campaigns, events, albums, and so on are downloaded, user interface 14200 (FIG. 14C) allows the clients to test the campaign and start the event. Once the tablet-based solution of the platform 1000 is started (FIG. 14E), the users can select photo manipulation options via user interface 14500 (FIG. 14F). FIG. 14H shows an exemplary user interface for capturing content with the tablet-based solution. At user interface 14800 (FIG. 14I), the user can review the captured content and select to retake or share the content. FIG. 14J shows an exemplary user interface 14900 where the user can provide at least one email address, social media contacts, and the like, for receiving and sharing the captured content.

Figure 15A:
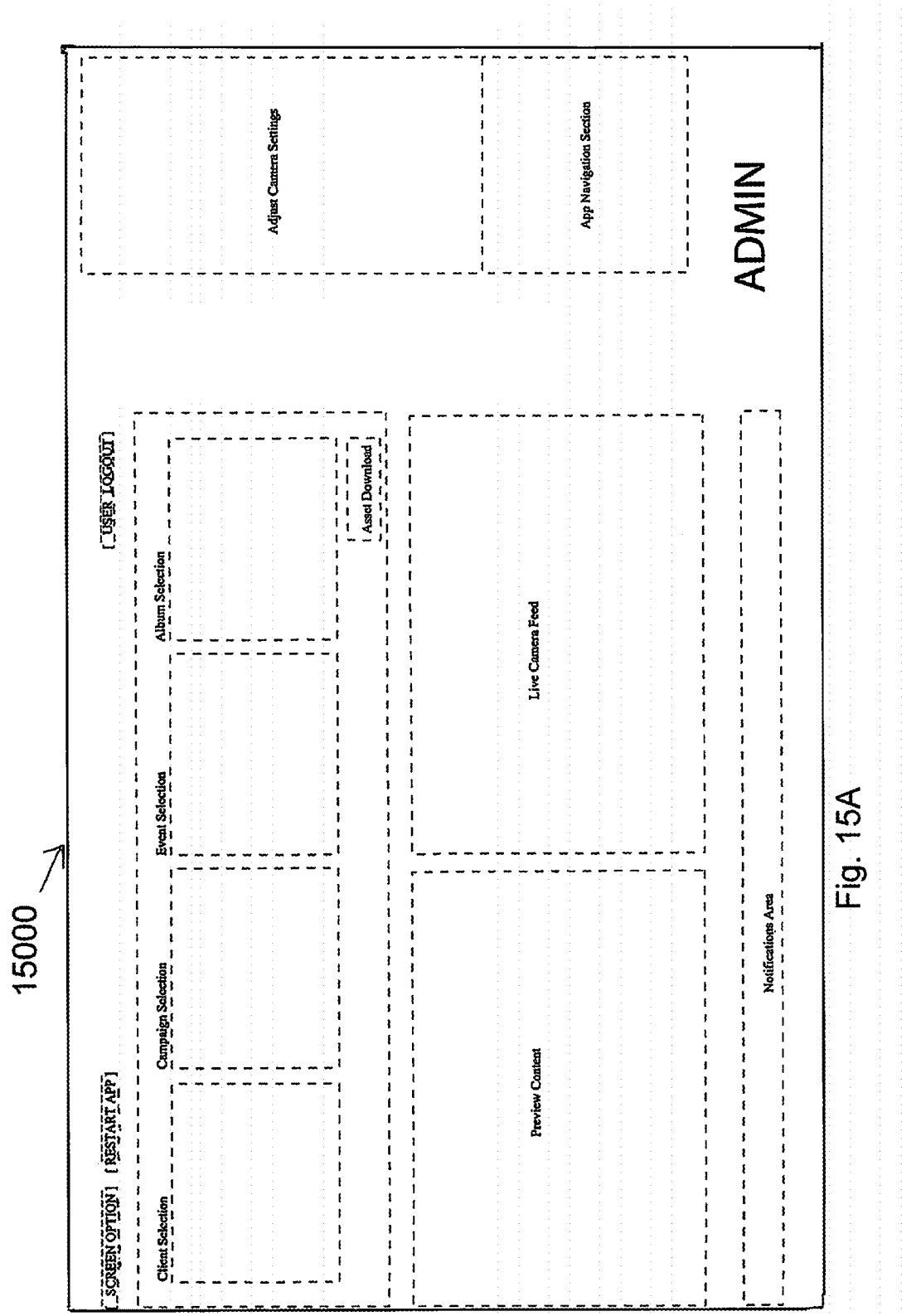
FIGS. 15A to 15G illustrate exemplary user interfaces of a kiosk image-capture solution according to some embodiments of the invention.
Figure 15B:
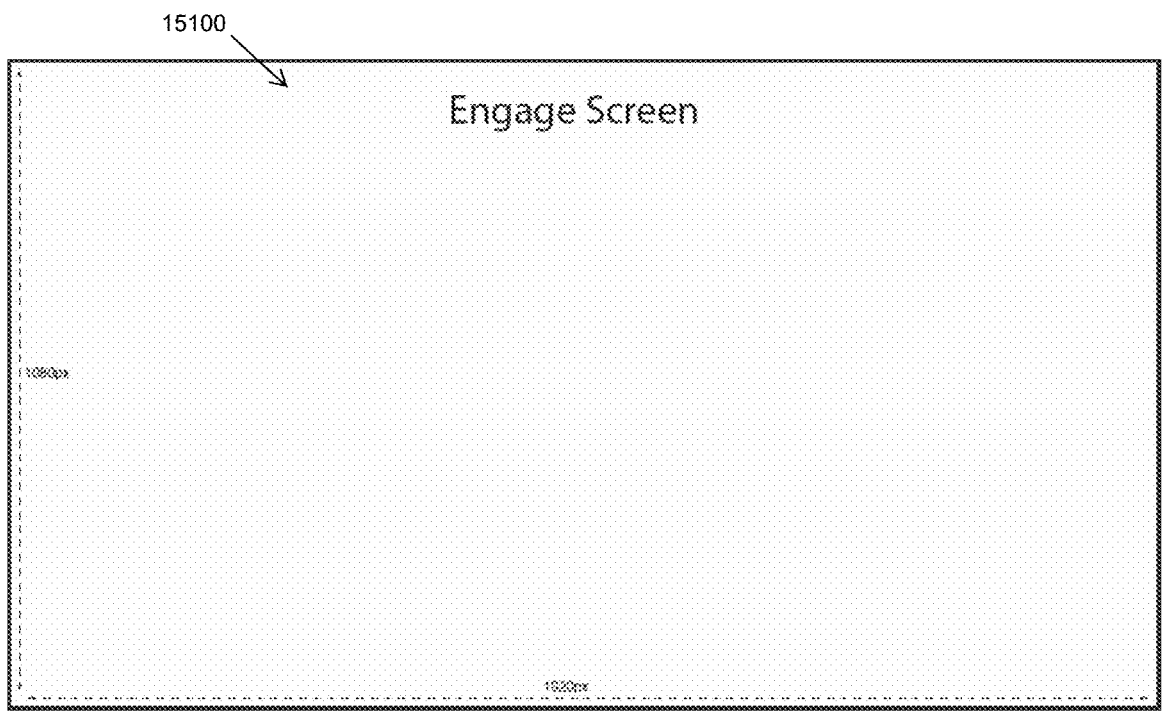
Figure 15C:
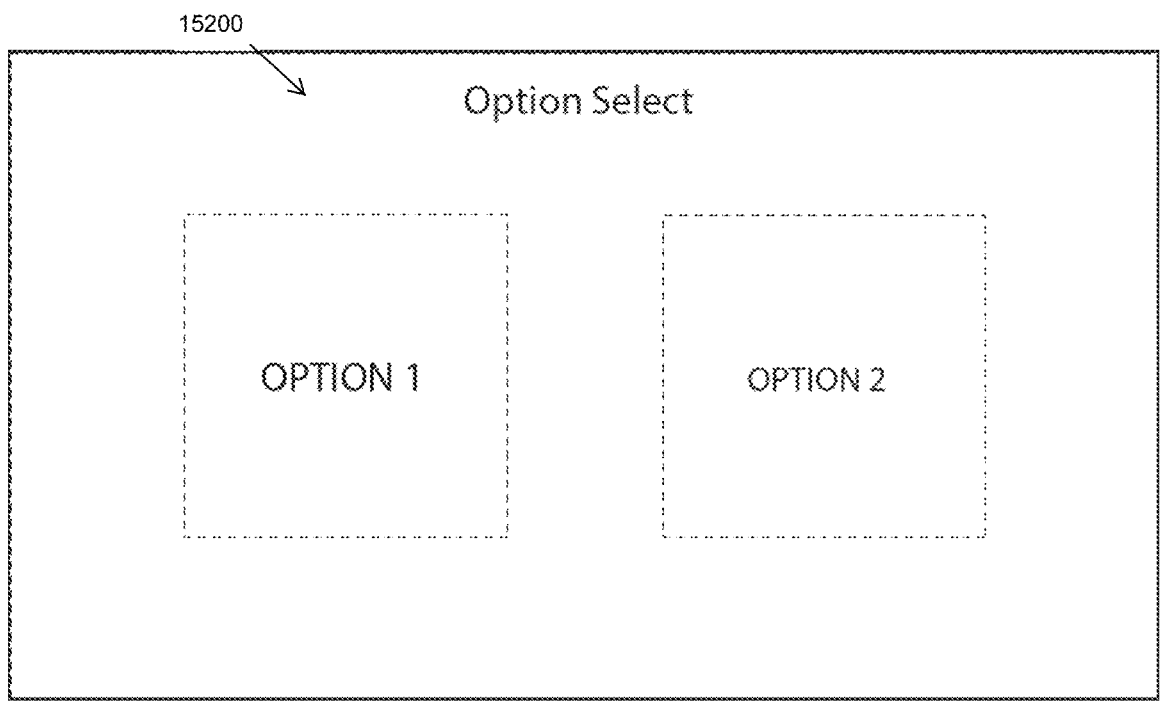
Figure 15D:
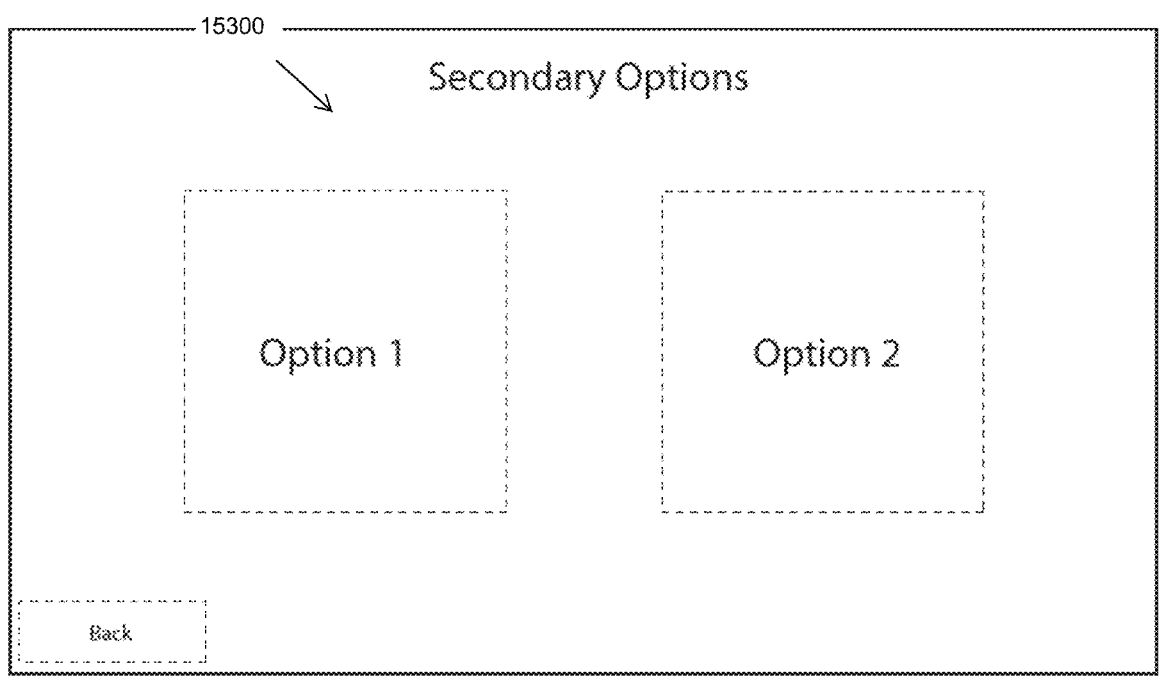
Figure 15E:
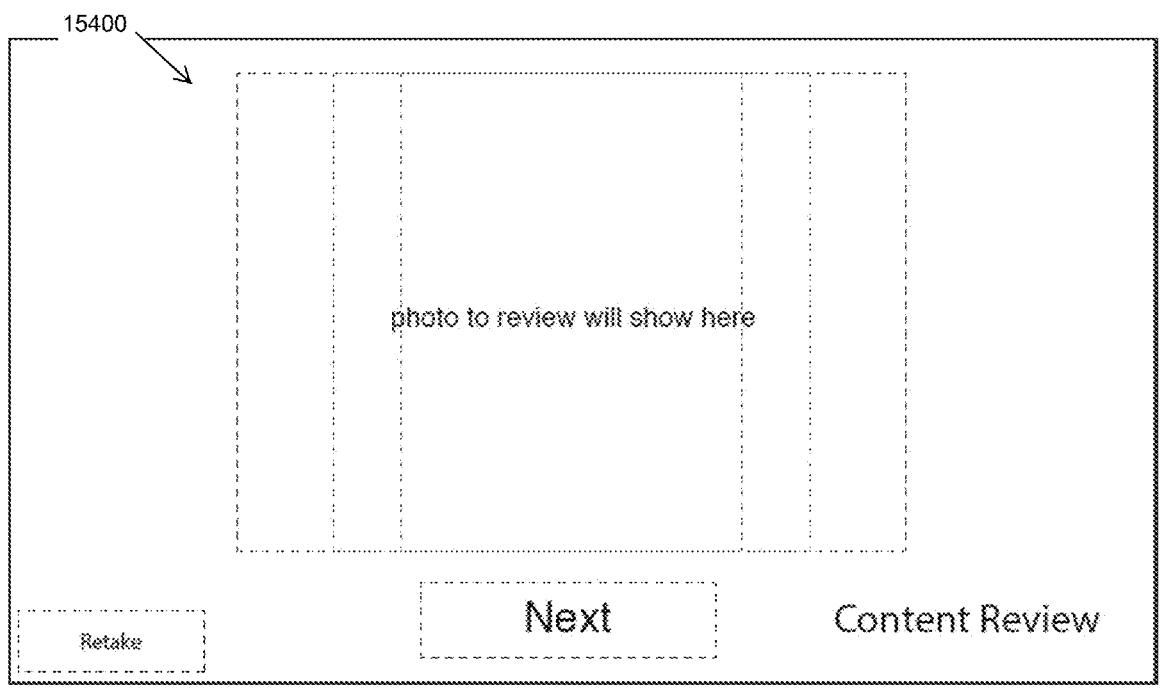
Figure 15F:
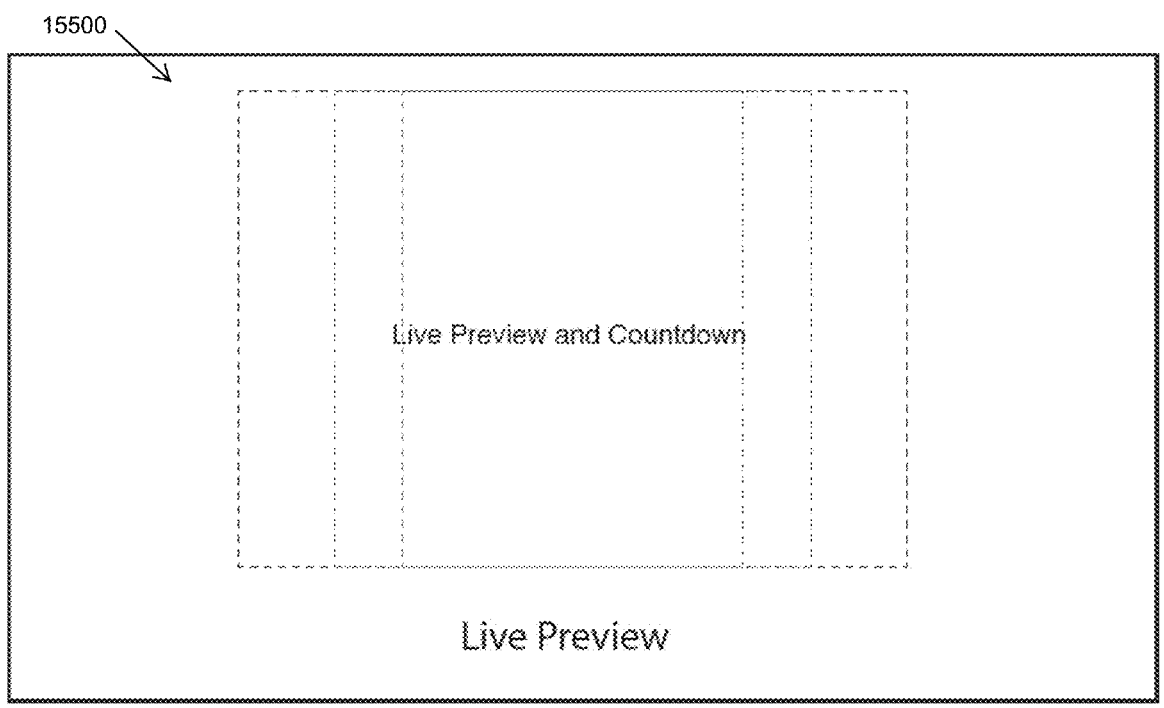
Figure 15G:
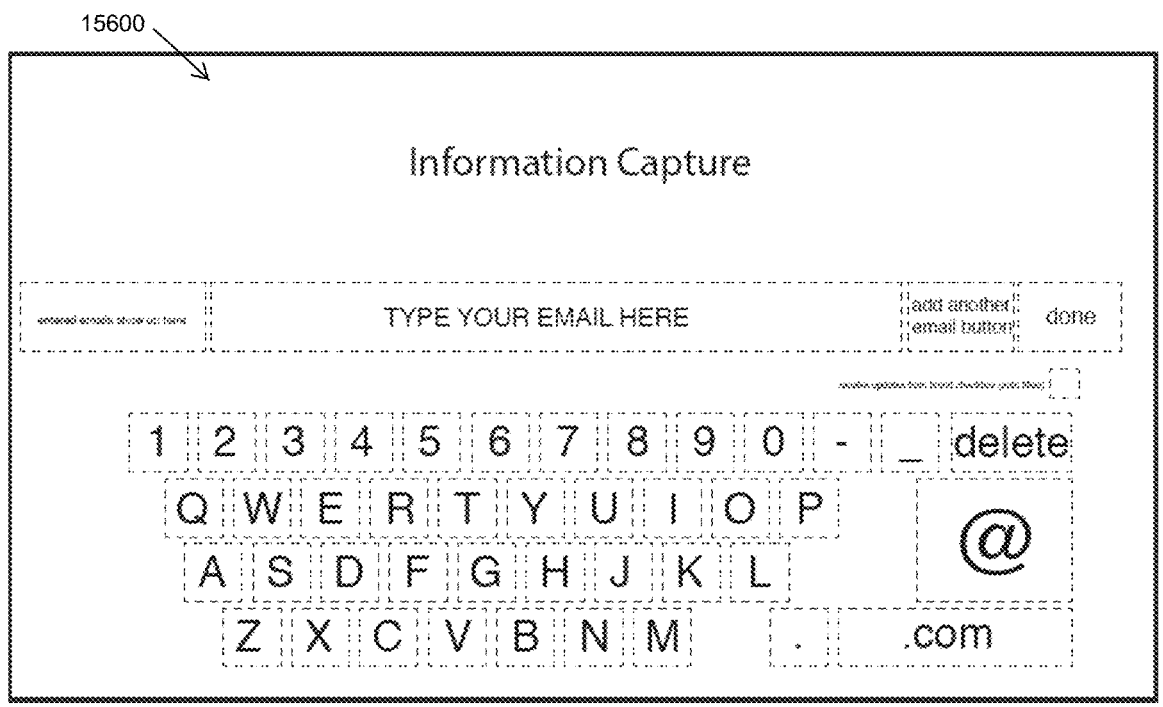

Turning to FIGS. 15A to 15G, according to some embodiments, exemplary kiosk user interfaces of the platform 1000 are shown. The user interfaces of FIGS. 15A to 15G allow the clients to search, select and download campaigns, events, albums, and so on, and adjust camera settings. The user interfaces allow users to select photo manipulation options, take photos or video content, enter email and social media contacts, and so on. For example, FIG. 15A shows user interface 15000 where the clients can ensure a proper internet connection prior to attempting to login to the content management system, adjust the camera settings, search the Content Management System for and select campaigns, events, albums, and so on. FIGS. 15B to 15D show user interfaces for users to begin the user experience process and select photo manipulation options. At user interfaces 15400 and 15500 (FIGS. 15E and 15F), the user can review the captured content and select to retake the content. FIG. 15G shows an exemplary user interface 15600 where the user can provide at least one email address, social media contacts, and the like, for receiving and sharing the captured content.

In another embodiment, the platform 1000 provides live feed of imagery and social media posts so that clients may set up web enabled screens throughout an event to display the feed. The feed may include, but is not limited to, static feed of photos, animated GIFs, randomized feed, social media feed and so on.

The example embodiments described above generally relate to an interactive presentation with the systems and methods described herein. It should be understood that in other embodiments, additional browser languages and presentation software can be used. In addition to the exemplary objects described herein, other supported objects may include, but are not limited to, GIFs, animations, transitions, links, video, audio, and so on. The combinations of user devices, browser languages and presentation software are numerous and modules, displays, and other tools described herein can be specific or centralized on a particular device in some embodiments while in other embodiments they can be distributed over multiple devices including standalone network.

The enablements described in above are considered novel over the prior art and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

What is claimed is:

1. A network connected system for capturing, storing and uploading image content, the network connected system comprising:
    a kiosk including:
        a computing device;
        a touch screen display coupled to the computing device;
        an image capture apparatus coupled to the computing device;
        a local storage coupled to the computing device to store image content;
        wherein the computing device executing instructions stored in memory that cause the computing device to:
            receive a user interface template from a content management system coupled the network connected system, wherein the user interface template defines user interface elements, including: background color, watermark, digital filter to be applied to an image captured by the image capture apparatus, location of storage of the captured image, and an executable file that interacts with a user via the touch screen display and that captures user input data from the touch screen display;
            provide a user interface at the touch screen display to display information and receive input from at least one user in accordance with the received user interface template;
            control the image capture apparatus to capture image of the at least one user;
            store the user input data and image content captured by the image capture apparatus in the local storage; and
            upload the user input data and captured image content to the content management system;
    wherein the content management system is a computer server system operatively coupled to the kiosk over a public network, the content management system including a database of preexisting user interface templates and a processor and instructions stored in memory that cause the content management system to:
        provide a graphical user interface for a user of the content management system that enables the content management system user to select a preexisting user interface template from the database and manipulate each of the user interface elements of the selected user interface template;
        provide a graphical user interface for the user of the content management system to generate a new user interface template and each of the corresponding user interface elements for storage in the database;
        transmit a user interface template selected by the content management system user to the kiosk;
        monitor and receive data captured by the kiosk during operation, including the captured image content and user input data; and
        transmit the captured image content and user input data to one or more remote host servers.

2. The network connected system of claim 1, wherein the computing device is a tablet.

3. The network connected system of claim 1, wherein the image capture apparatus captures at least one photo.

4. The network connected system of claim 3, wherein the computing device further executing instructions stored in memory that cause the computing device to manipulate the at least one photo to create animated content.

5. The network connected system of claim 1, wherein the image capture apparatus captures at least one video.

6. The network connected system of claim 1, wherein the computing device further executing instructions stored in memory that cause the computing device to manipulate the image content.

7. The network connected system of claim 1, wherein the network connected system is a stand-alone kiosk.

8. The network connected system of claim 1, wherein the network connected system is mounted on a support structure.

9. The network connected system of claim 1, wherein the executable file is an interactive program that receives input from a user of the kiosk via the touch screen to graphically manipulate the screen, and further wherein the interaction between the kiosk user and the interactive program is also captured by the kiosk as user input data.

10. The network connected system of claim 1, wherein the executable file is an interactive program that displays a plurality of graphical choices to a user of the kiosk and captures the user's selection via the touch screen as user input data.

11. The network connected system of claim 1, wherein the executable file is an interactive program that displays an input box to a user of the kiosk and captures the user's identification via the touch screen as user input data, including at least one of a phone number, email address, and social media identification.

12. The network connected system of claim 1, wherein the content management system further provides an application programming interface for one or more remote third party application development programs to define a user interface template for the kiosk.

13. The network connected system of claim 1, wherein the location of the storage of the captured image includes at least one of an email server, a host server, and a third party remote database.

14. The network connected system of claim 1, wherein the user interface elements further includes an animation script.

15. The network connected system of claim 1, wherein the content management system further includes instructions to transmit software updates to the kiosk.

* * * * *